(12) United States Patent
Fiedler

(10) Patent No.: US 9,044,071 B2
(45) Date of Patent: Jun. 2, 2015

(54) LOCK DEVICE

(75) Inventor: Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 497 days.

(21) Appl. No.: 13/394,265

(22) PCT Filed: Sep. 8, 2010

(86) PCT No.: PCT/EP2010/005504
§ 371 (c)(1),
(2), (4) Date: May 16, 2012

(87) PCT Pub. No.: WO2011/029582
PCT Pub. Date: Mar. 17, 2011

(65) Prior Publication Data
US 2012/0227220 A1  Sep. 13, 2012

(30) Foreign Application Priority Data
Sep. 8, 2009 (DE) .......................... 10 2009 040 462

(51) Int. Cl.
| F16B 2/20 | (2006.01) |
| A44B 11/26 | (2006.01) |
| A01K 27/00 | (2006.01) |
| A45C 13/10 | (2006.01) |
| A45C 13/12 | (2006.01) |

(52) U.S. Cl.
CPC ......... *A44B 11/266* (2013.01); *Y10T 24/44034* (2013.01); *A01K 27/005* (2013.01); *A45C 13/10* (2013.01); *A45C 13/12* (2013.01)

(58) Field of Classification Search
CPC .... A44B 11/266; A44B 11/2523; A42B 3/08; B61G 1/40; Y10S 24/31; Y10S 2/909
USPC ................ 24/459, 595.1, 614, 615, 647, 648
See application file for complete search history.

(56) References Cited

U.S. PATENT DOCUMENTS

| 747,768 | A | * | 12/1903 | Requard | ....................... | 213/177 |
| 4,559,679 | A | | 12/1985 | Downey | | |
| 7,219,406 | B2 | * | 5/2007 | Chui | .............................. | 24/625 |
| 7,430,789 | B2 | * | 10/2008 | Wright | ........................... | 24/615 |
| 8,484,814 | B2 | * | 7/2013 | Parisi | .............................. | 24/614 |
| 2004/0226150 | A1 | * | 11/2004 | Beletsky | ........................ | 24/625 |
| 2005/0150089 | A1 | | 7/2005 | Benedict | | |
| 2006/0272136 | A1 | | 12/2006 | Chui | | |
| 2009/0100652 | A1 | | 4/2009 | Mok | | |

FOREIGN PATENT DOCUMENTS

| CN | 101119658 A | 2/2008 |
| CN | 101416805 A | 4/2009 |
| DE | 202004011353 U1 | 12/2004 |

* cited by examiner

*Primary Examiner* — Robert J Sandy
*Assistant Examiner* — David Upchurch
(74) *Attorney, Agent, or Firm* — The Webb Law Firm

(57) ABSTRACT

A lock device includes a first lock part, a second lock part, which can be arranged on the first lock part in a fastening direction and is connected to the first lock part in a closing state, and an actuating element, on which the second lock part is movably arranged. In the closing state the second lock part is held on the first lock part via the actuating element, and the second lock part acts with the actuating element such that in a loaded state, when force is acting on the second lock part relative to the first lock part along the fastening direction, the actuating element is rigidly connected to the first lock part and holds the second lock part on the first lock part, whereas in an unloaded state the second lock part can be detached from the first lock part by actuation of the actuating element.

20 Claims, 35 Drawing Sheets

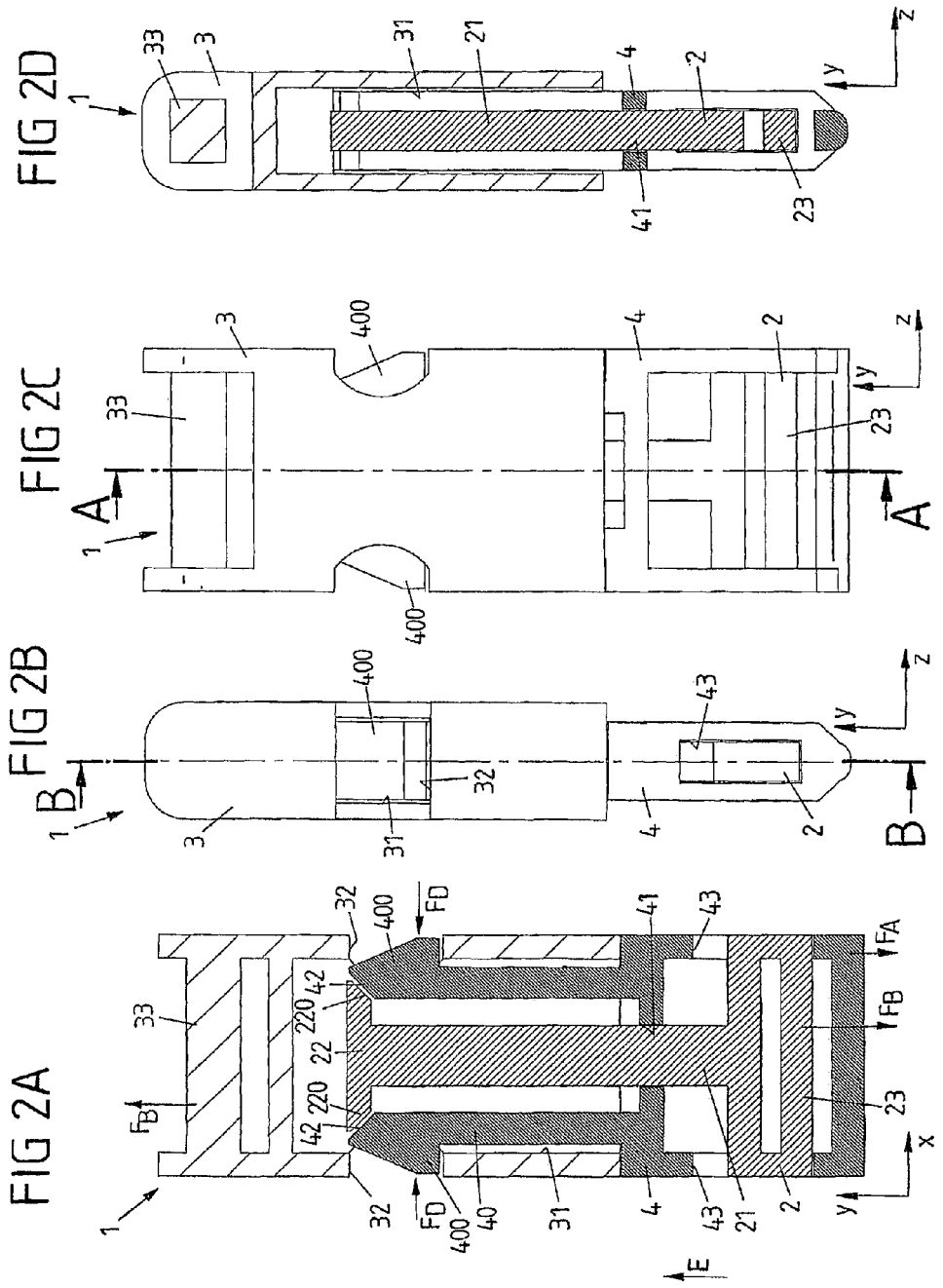

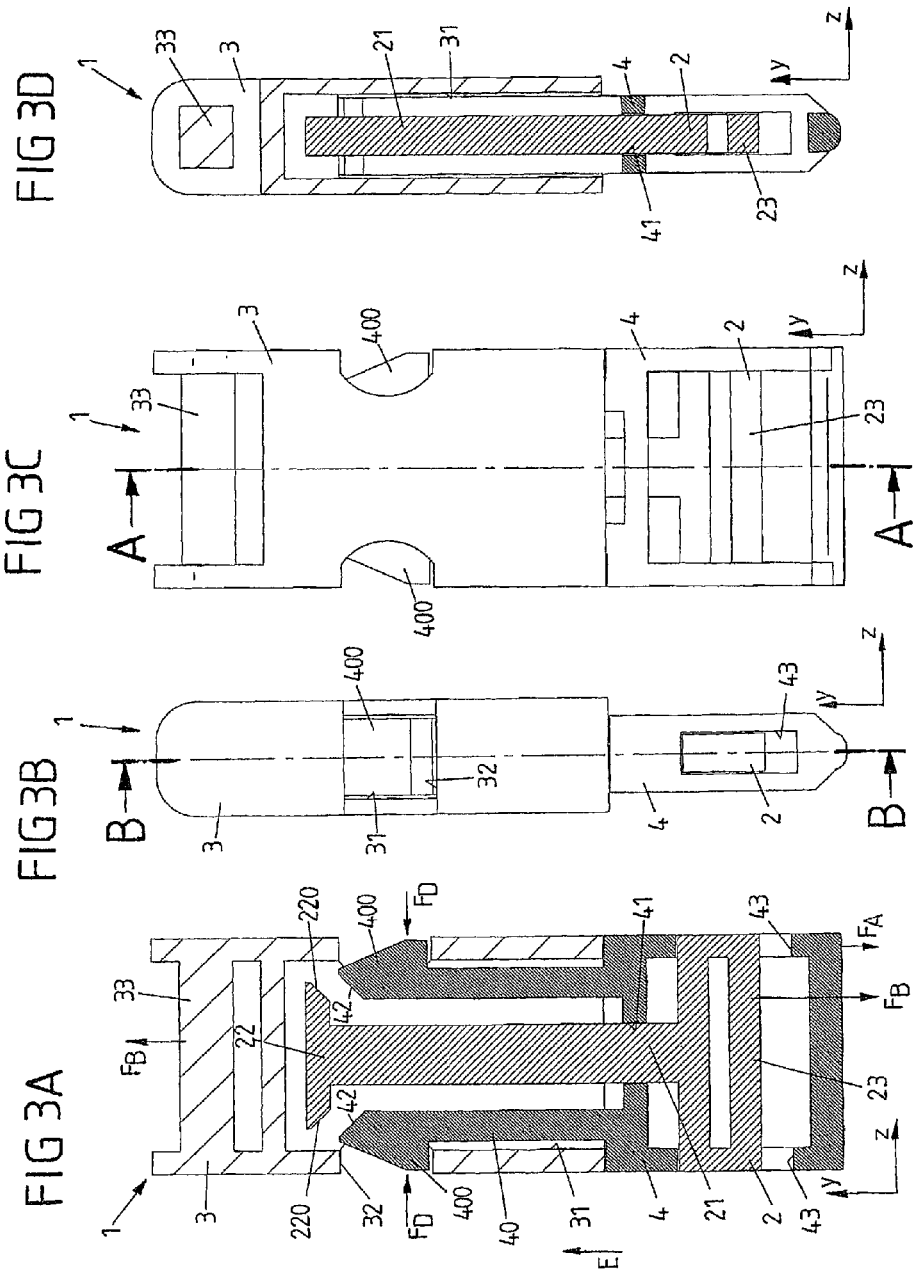

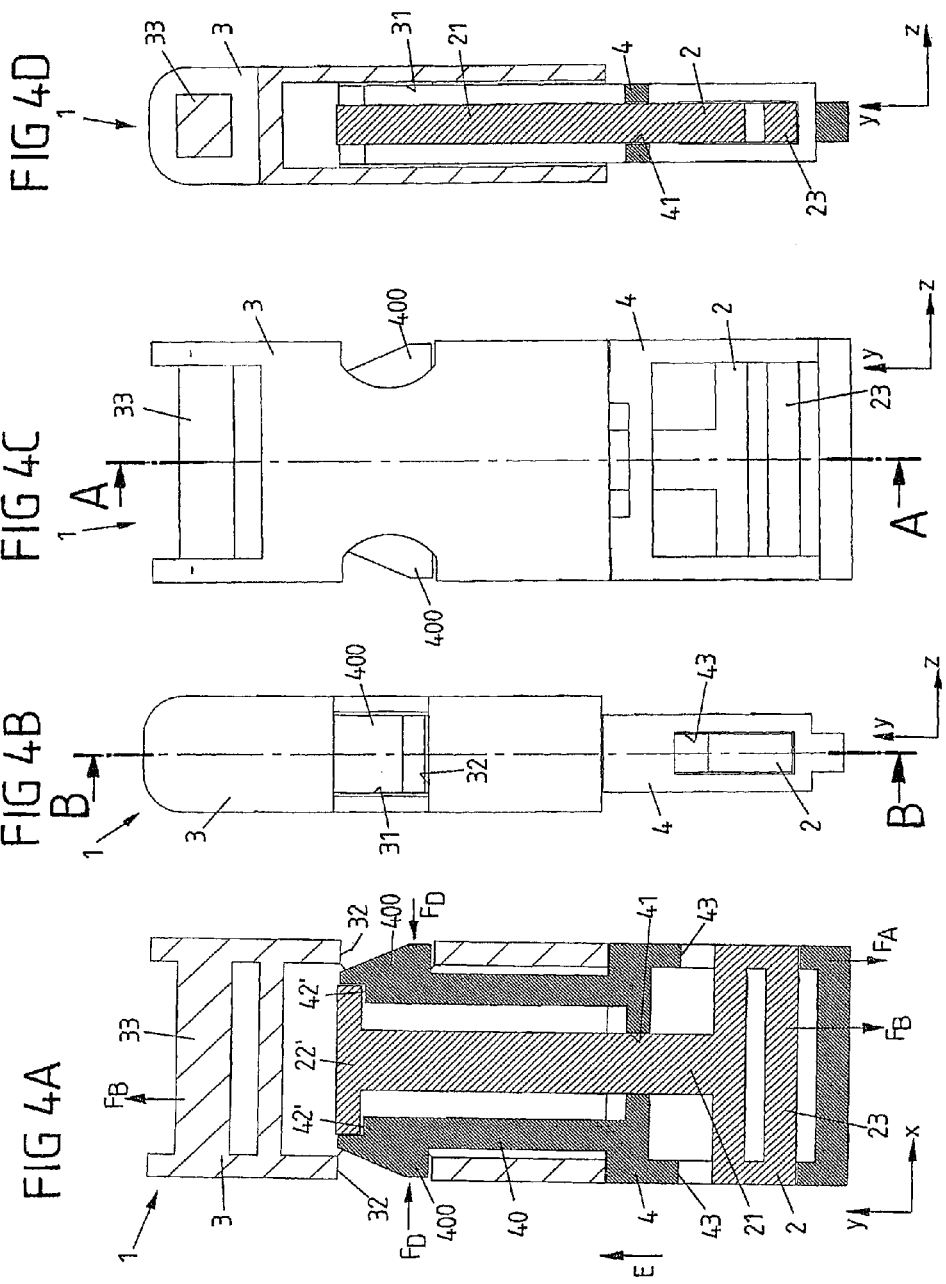

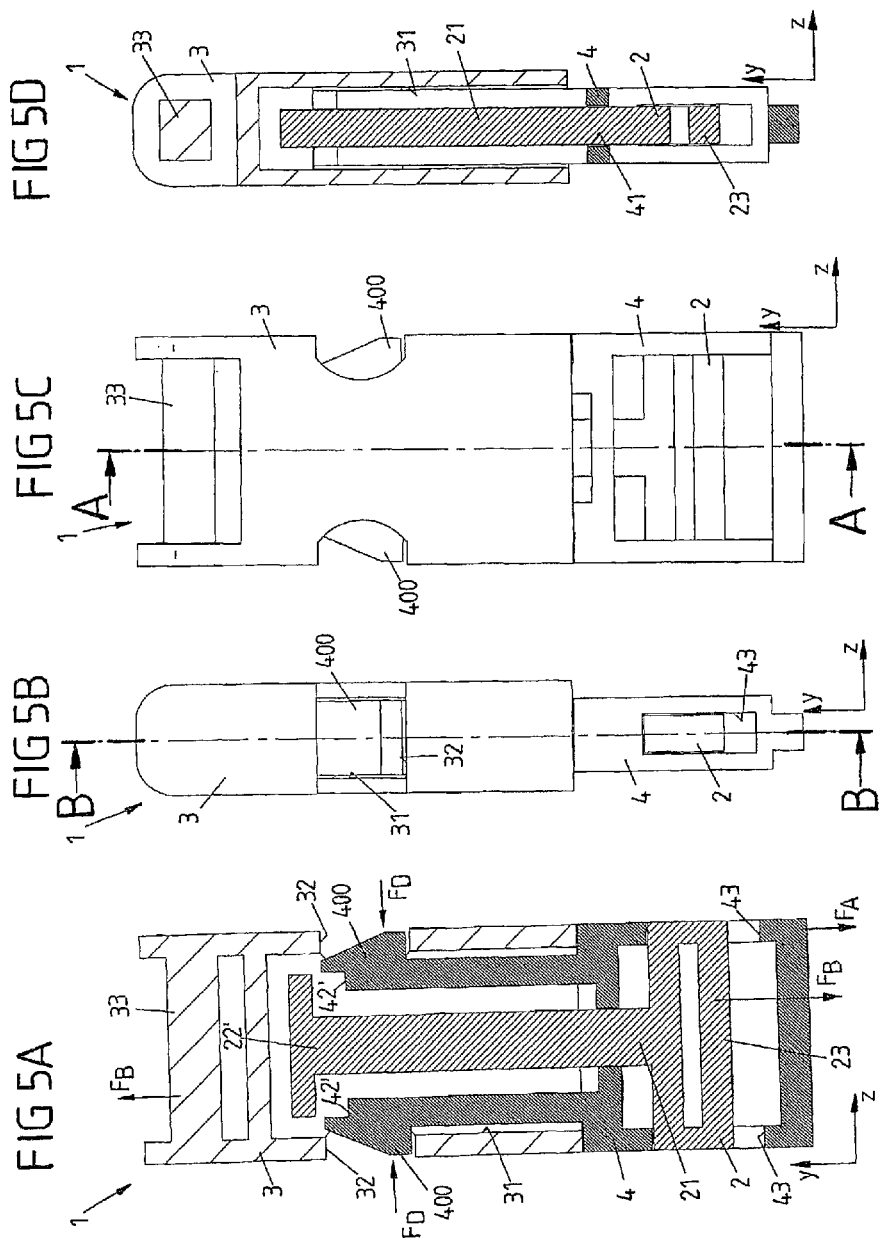

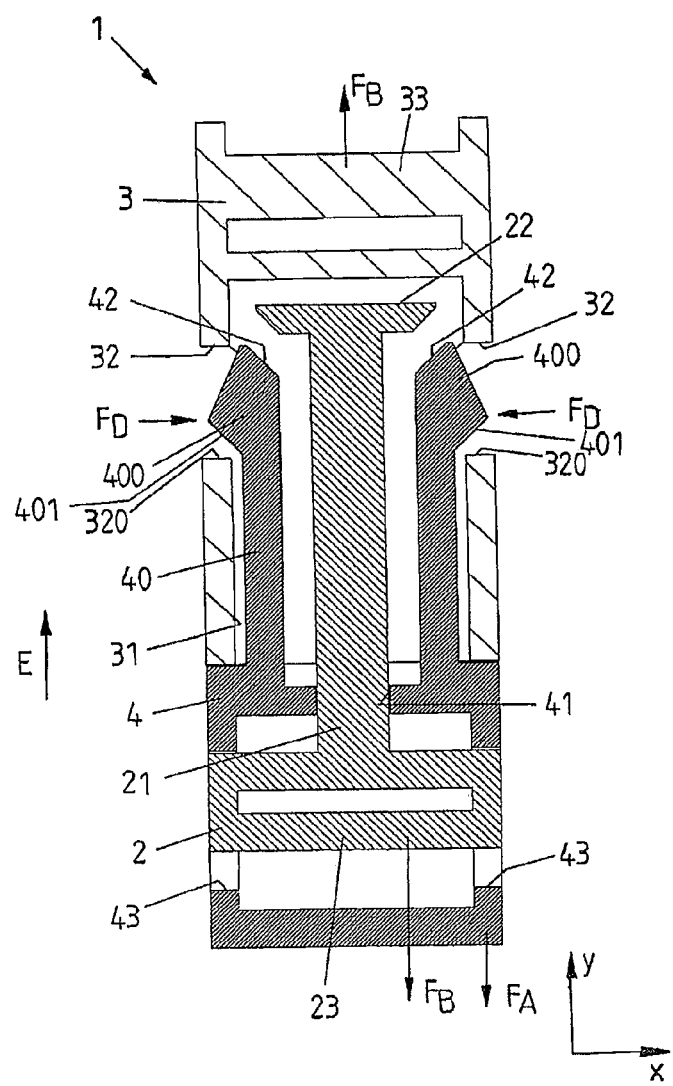

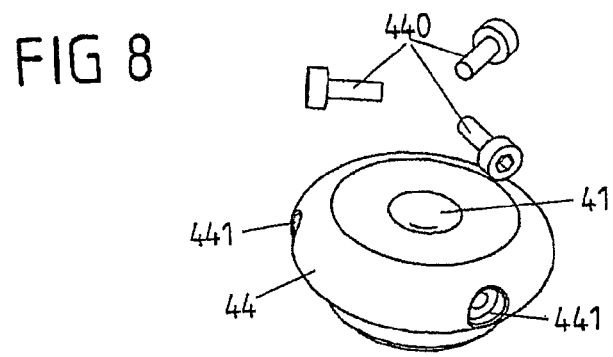
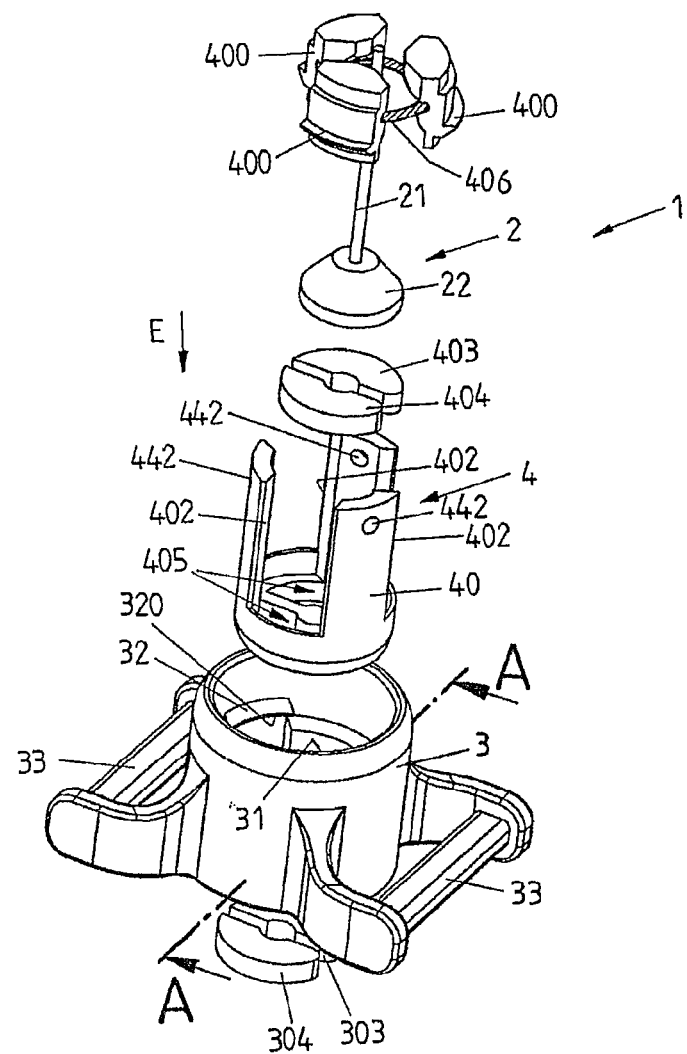

FIG 11B
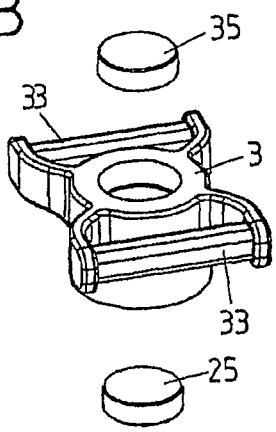
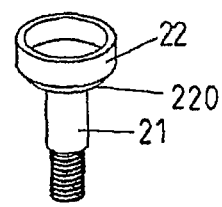
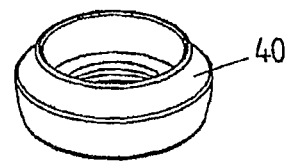
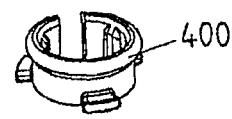
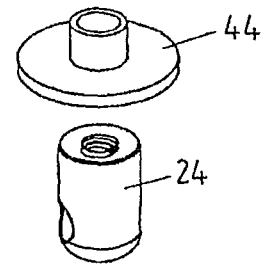

FIG 14A
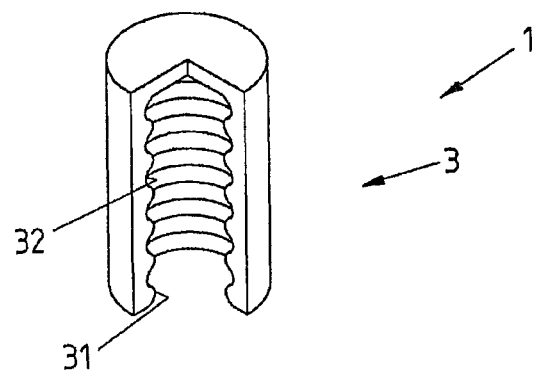
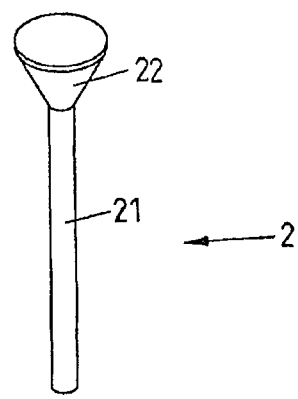
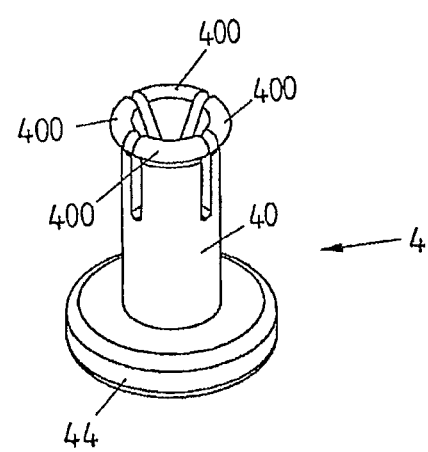

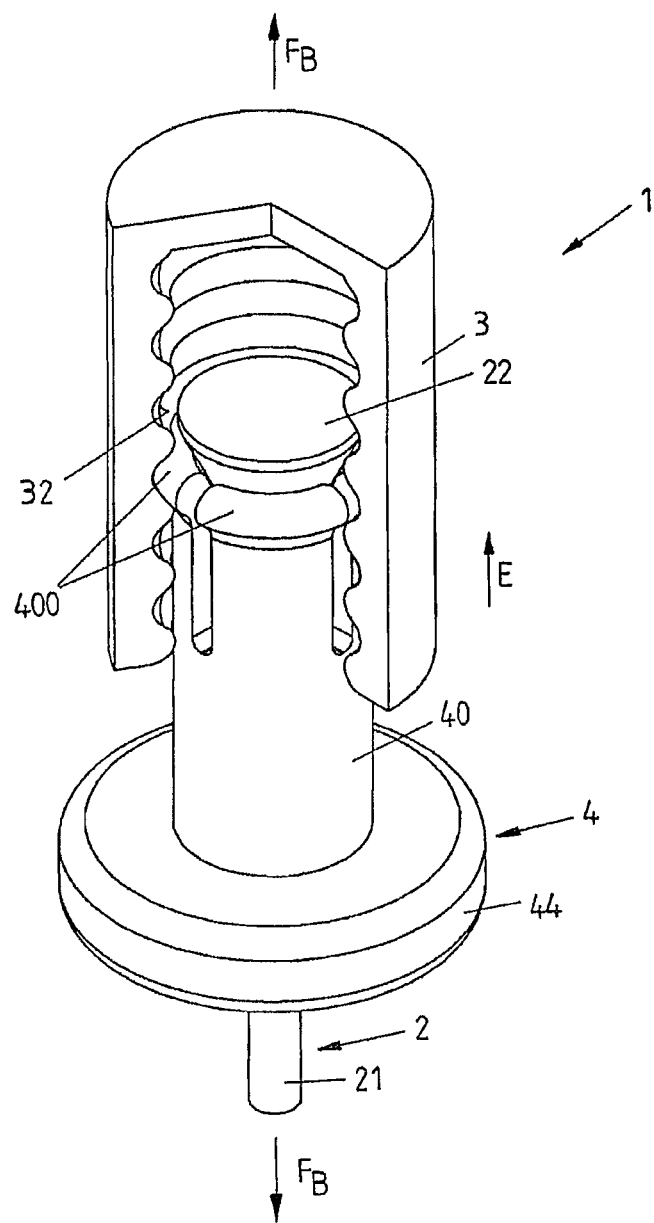

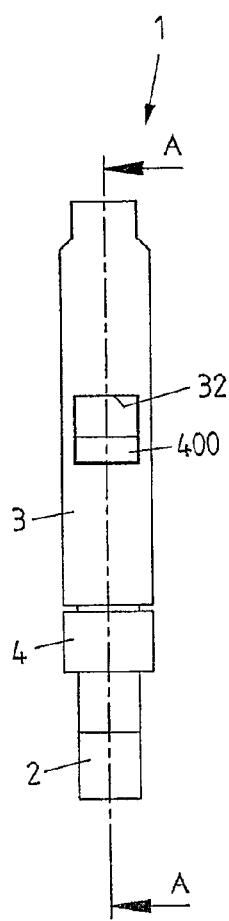
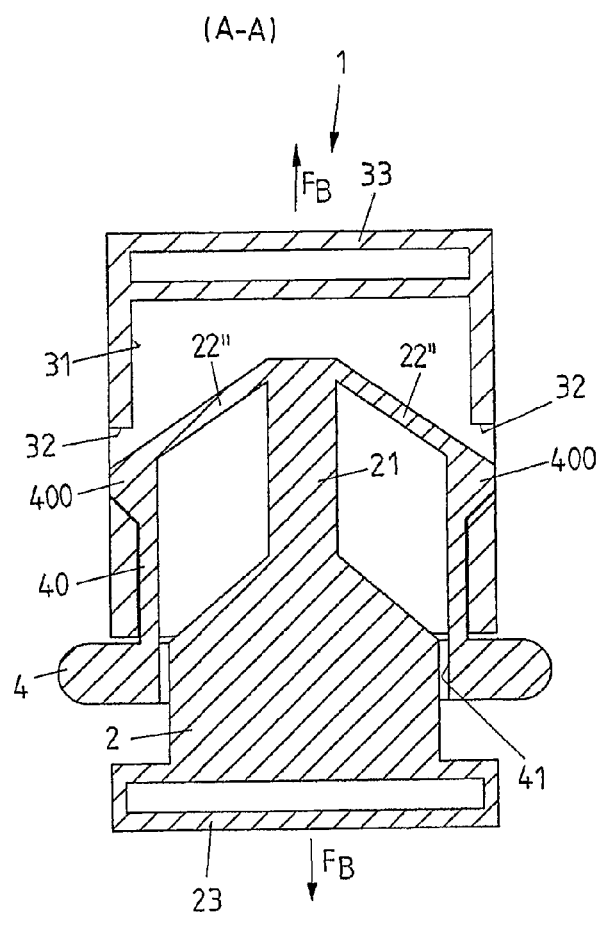

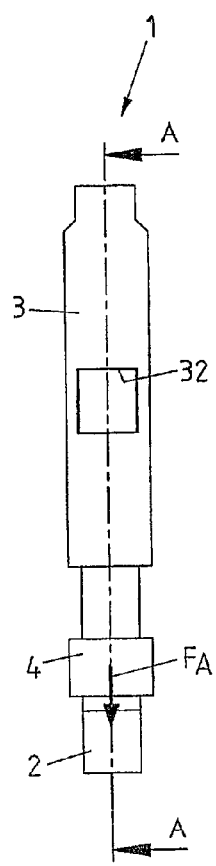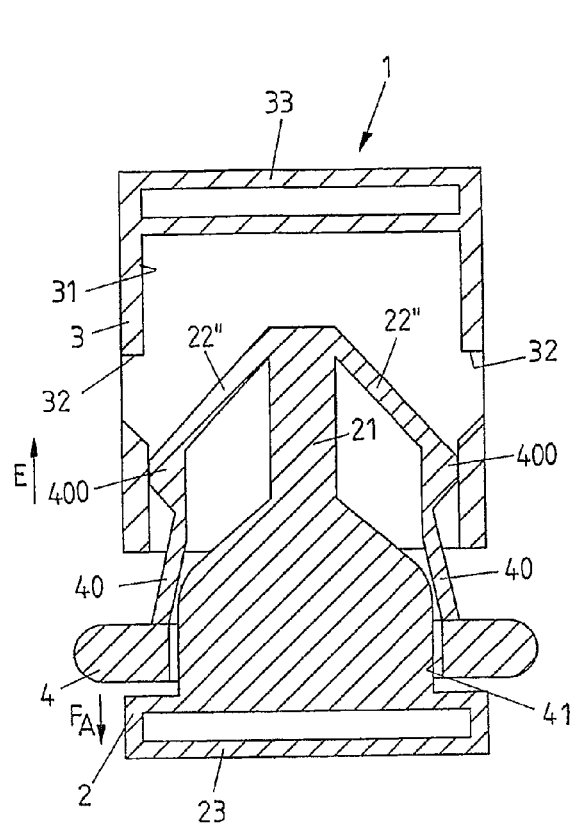

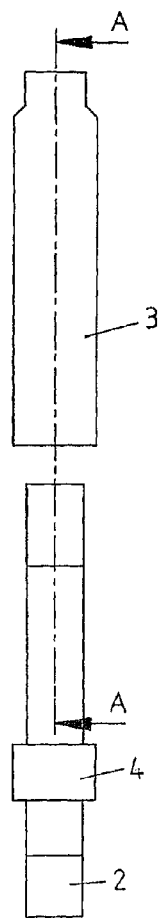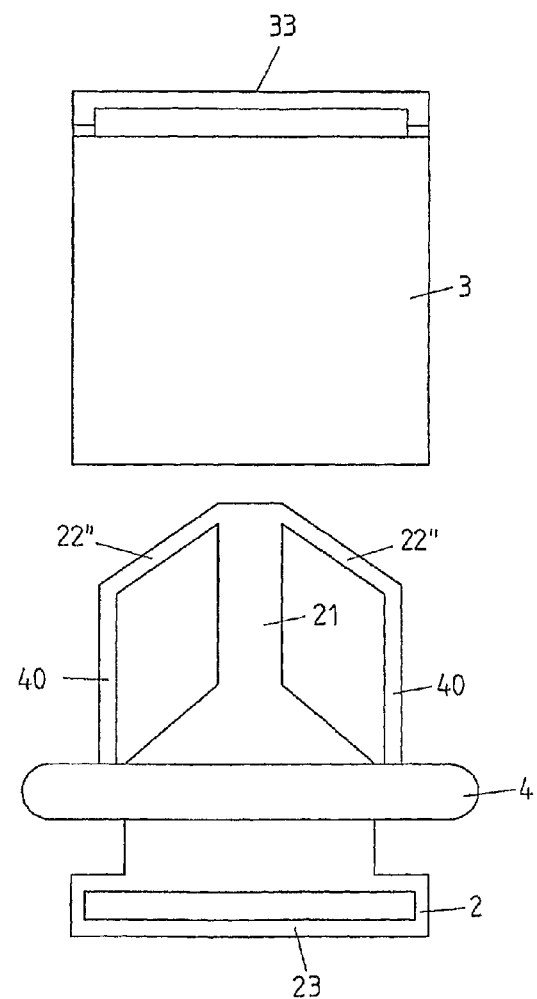

FIG 16E
FIG 16F
(A-A)
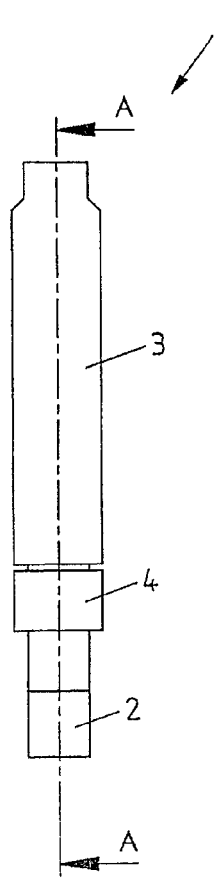
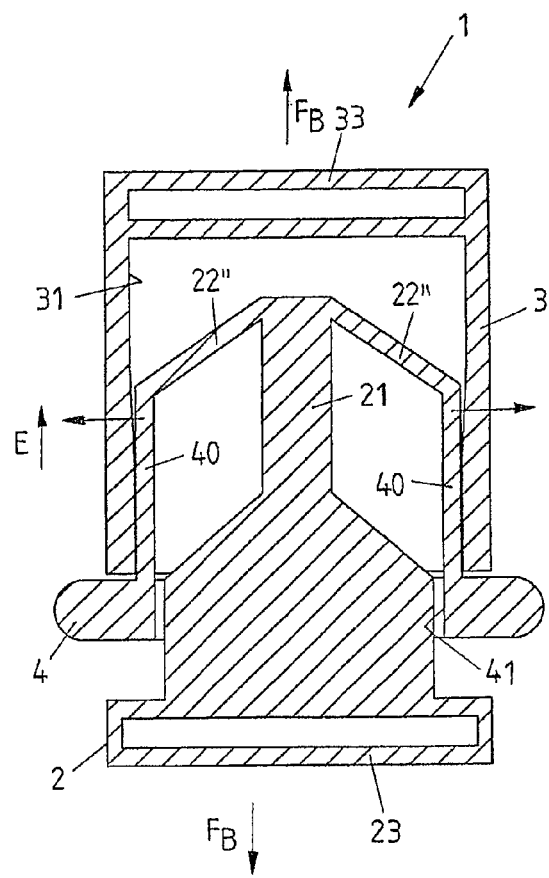

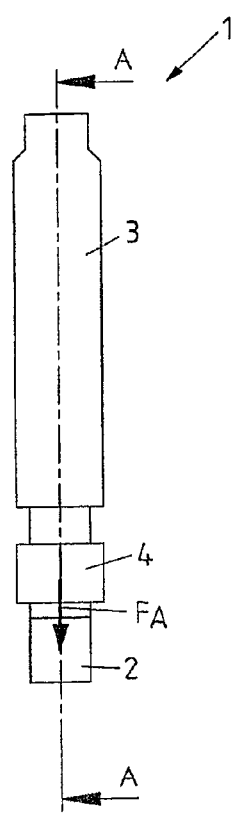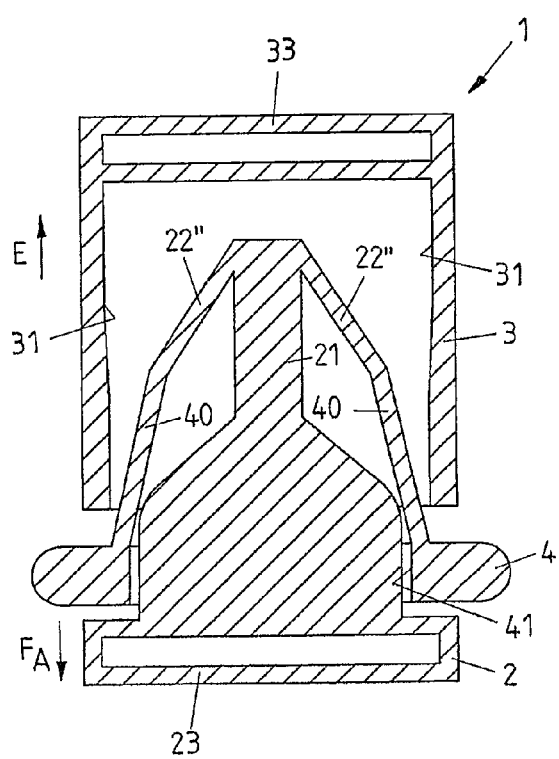

LOCK DEVICE

CROSS-REFERENCE TO RELATED APPLICATION

This application is a National Phase Patent Application of International Patent Application Number PCT/EP2010/005504, filed on Sep. 8, 2010, which claims priority of German Patent Application Number 10 2009 040 462.7, filed on Sep. 8 2009.

BACKGROUND

The invention relates to a lock device.
Such a lock device comprises
a first lock part,
a second lock part, which can in a fastening direction be arranged on the first lock part and is connected to the first lock part in a closing state, and
an actuating element, on which the second lock part is movably arranged.

Such lock devices can in particular be applied everywhere, where two parts are to be detachably connected to each other. For example, such a lock device is suitable as a lock for a bag or another container, as holding device or as connecting device to connect two elements under tension, for example two hauling ropes or straps. In concrete application such a lock device can for example be employed to couple a leash with a collar for pets.

An application when elements are loaded by compression is also conceivable.

In the lock device the second lock part is held on the first lock part via the actuating element in the closing state. For this purpose, the second lock part acts together with the actuating element in such a way that in a loaded state, when a force is acting on the second lock part relative to the first lock part along the fastening direction, the actuating element is rigidly connected to the first lock part and holds the second lock part on the first lock part. In other words, the second lock part is not directly fastened onto the first lock part, but instead is held on the first lock part indirectly via the actuating element. When the second lock part is under tension, the second lock part acts on the actuating element and blocks the actuating element in such a way that the actuating element cannot be readily detached from the first lock part and, consequently, the lock device is blocked. In the loaded state the first lock part and the second lock part are in this manner rigidly connected to each other via the actuating element.

In an unloaded state, however, in which no or only a small force is acting on the second lock part relative to the first lock part, the lock device is not blocked, and the second lock part can be detached from the first lock part by actuating the actuating element.

Conventionally, in order to couple a dog leash with a dog collar for example, a karabiner is used which is arranged on the dog leash and engages with a fastening bracket on the dog collar. Such karabiners are also used to connect two hauling ropes and can basically transmit great tensile forces. In particular when used on a dog leash, however, conventional karabiners can be difficult and possibly unwieldy to handle.

In a lock device for the connection of a leash to a collar, known from DE 20 2004 011 353 U1, a connecting element, integrated into the collar, is provided which acts together with a counter element, provided on a fastening element on a leash, to form a detachable quick coupling. The counter element here consists of two elastically malleable half shells, which form a ball together and can be catch-lockingly inserted into a ball housing on the collar. By shifting a sleeve, serving as actuating element, the half shells are then elastically reshaped in such a way that the catch locking engagement with the ball housing is released and the counter element can be taken out from the collar and in this manner the leash can be detached from the collar.

SUMMARY OF THE INVENTION

It is an object of the present invention to provide a lock device which can be actuated in a simple and haptically pleasant manner and which at the same time creates a rigid connection of two lock parts, which cannot be detached in the loaded state.

According to an exemplary embodiment of the invention, in a lock device of the kind mentioned in the beginning it is provided that in the closing state the actuating element is held by friction or catch locking on the first lock part via a section which is elastic at least in sections.

Exemplary, the friction-locking connection or the catch locking connection between the actuating element and the first lock part is blocked in the loaded state of the second lock part, whereas it can be released in the unloaded state of the second lock part.

In the lock device the second lock part is held on the first lock part via the actuating element in the closing state and, consequently, a connection between the first lock part and the second lock part is established. The connection between the actuating element and the first lock part is formed friction-locking or catch-locking via a section, which is elastic at least in sections, therefore representing a friction-locking connection or a catch locking connection, in the scope of which the actuating element is held friction-lockingly or positive-lockingly on the first lock part. The second lock part, which is movably arranged on the actuating element, here acts together with the actuating element in such a way that in the loaded state, that is when a force is acting on the second lock part, the friction-locking or positive-locking connection of the actuating element to the first lock part is blocked and cannot be released. In the loaded state the connection consequently cannot be released, so that also great forces between the first lock part and the second lock part can be securely absorbed by the lock device and an unintended release is impossible.

In the unloaded state, however, in which no or only small forces are acting on the second lock part, the lock device is not blocked. In other words, the friction-locking or catch locking connection of the actuating element to the first lock part indeed basically persists in the unloaded state, but it can be released to separate the first lock part from the second lock part and to open the lock device. In the unloaded state the lock device thus can be released, the friction-locking or catch locking connection between the actuating element and the first lock part can be terminated, and the actuating element can be taken out from the first lock part together with the second lock part.

As the friction-locking or positive-locking connection is established via a section of the actuating element which is elastic at least in sections, in the closing state the result is an especially rigid connection with a friction locking or a force-fit locking, which is also suitable to absorb great forces but which, at the same time, can be released again in an easy and haptically pleasant manner.

To establish the closing state, the actuating element can for example in the fastening direction be insertable into a recess (for example a bore) of the first lock part together with the second lock part and, to release, can be removable out of the recess counter to the fastening direction. To close the lock device the actuating element is in the fastening direction inserted into the recess of the first lock part together with the second lock part and is catch-lockingly engaged with the first lock part. To release the lock device the actuating element can then be taken out of the recess counter to the fastening direction, wherein for this purpose the friction-locking or catch locking connection between the actuating element and the first lock part is released in the unloaded state of the second lock part.

The second lock part can for example be movably arranged on the actuating element along the fastening direction. For this purpose, the second lock part is shiftably mounted on the actuating element for example via at least one guiding opening, wherein, when the second lock part is loaded, the second lock part can at least by a small distance be adjusted relative to the actuating element to block the friction-locking or catch locking connection of the actuating element to the first lock part.

In an exemplary embodiment of a lock device in the closing state the actuating element can in the loaded state be friction-lockingly held on the first lock part by static friction. In the loaded state the second lock part then acts on the actuating element in such a way that said actuating element comes into friction locking with the first lock part and cannot readily be detached from the first lock part. The second lock part can for this purpose for example have a blocking section with at least one run-up slope, which, when a tensile or compressive force is acting on the second lock part relative to the first lock part along the fastening direction, runs up onto a run-up slope on a section of the actuating element, so that the blocking section friction-lockingly, as a kind of self-locking, connects the section of the actuating element to the first lock part.

In an alternative embodiment the second lock part can also have a blocking section which connects the second lock part and the actuating element in particular in one piece to each other in such a way that, when a force is acting on the second lock part, the blocking section acts on a section of the actuating element, so that the blocking section friction-lockingly connects the section of the actuating element to the first lock part.

In this embodiment the lock part and the actuating element are directly connected to each other for example in one piece or by joints via a lever, wherein the actuating element and the lock part are movable relative to each other at least by a small distance, in that the blocking section and also the section of the actuating element which the blocking section acts upon are formed spring-elastic at least in sections. When a force acts on the second lock part counter to the fastening direction, the blocking section, connecting the second lock part to the actuating element, pushes the section of the actuating element into friction-locking contact with the first lock part, so that the actuating element is held friction-lockingly, as a kind of self-locking, on the first lock part.

In this embodiment the actuating element is held on the first lock part by static friction also in the unloaded state, so that also in the unloaded state the actuating element cannot readily slip from the first lock part. Nonetheless, the lock device can be opened in a simple manner in the unloaded state by pulling the actuating element from the first lock part, wherein for this purpose the static friction, acting between the first lock part and the actuating element, and additionally the magnetic attracting force have to be overcome.

When the actuating element is held catch-lockingly on the first lock part in the closing state, it has at least one catch locking element to establish the catch locking connection which in the closing state engages positive-lockingly with a catch section, for example a catch lock opening, on the first lock part. The catch-locking connection of the actuating element to the first lock part is consequently positive-locking and is established via suitable catch locking elements which convey a force, acting on the second lock part, into the first lock part via the actuating element and establish the connection of the second lock part to the first lock part.

The second lock part can advantageously have a blocking section, which in the loaded state, when a force is acting on the second lock part, acts together with the at least one catch locking element of the actuating element to block the catch-locking connection of the actuating element to the first lock part.

Different embodiments of such a blocking section are conceivable and advantageous.

In a first exemplary variant the blocking section can have at least one run-up slope, which, when a force is acting on the second lock part, runs up unto the catch locking element in such a way that the at least one catch locking element cannot be detached from the catch section. Here, the at least one catch locking element can likewise have a run-up slope. As the blocking section is running up onto the catch locking element the catch locking element is pushed into engagement with the catch section, so that removing the catch locking element from the catch section, namely for example out of the catch lock opening, is not possible. The blocking section consequently counteracts a detachment of the catch locking element from the catch section.

The blocking section can for example be designed conical and be arranged in a conical recess of the actuating element, wherein the conical shell surface of the blocking section runs up onto correspondingly bevelled run-up slopes of one or multiple catch locking elements to block the catch locking connection between the actuating element and the first lock part.

In a second exemplary variant the blocking section can, when a force is acting on the second lock part, come into engagement with a housing section of the at least one catch locking element in such a way that the at least one catch locking element cannot be detached from the catch section. In this second variant no run-up slopes are used, but instead the blocking section engages as a moulded part with a correspondingly shaped housing section of the at least one catch locking element. The blocking section can for this purpose for example be designed cylindrical, wherein upon the engagement of the blocking section with the housing section on the catch locking element the catch locking element is blocked in such a way that it cannot be brought out of engagement with the catch section. The blocking section consequently serves as a blockade, which counteracts a movement of the catch locking element from the catch section.

An advantage of the embodiment with run-up slope lies in the fact that the contact pressure, which is produced when the blocking section runs up onto the at least one catch locking element of the actuating element, can be used to prevent a further movement of the actuating element, particularly in that the actuating element, by the effect of the contact pressure, acts together friction-locking or positive-locking with the first lock part in such a way that a movement tangential or transverse to the fastening direction is prevented.

An advantage of the embodiment without run-up slope lies in the fact that the path, which the second lock part travels from the unblocked into the blocked state, can be very short.

In a third exemplary variant the blocking section can connect the second lock part and the actuating element with each other particularly in one piece in such a way that, when a force is acting on the second lock part, the blocking section acts on a section of the actuating element in such a way that the at least one catch locking element cannot be detached from the catch section. The actuating element and the second lock part are thus directly connected to each other, here however movable relative to each other at least by a short distance, wherein, when a force is acting on the second lock part counter to the fastening direction, the catch locking element is pushed into engagement with the catch section by effect of the blocking section, which is designed elastic at the least in sections, so that the catch locking element cannot be detached from the catch section.

In the unloaded state, in which no force is acting on the second lock part, the catch locking connection between the actuating element and the first lock part can be released. To release the positive-locking catch locking connection between the at least one catch locking element of the actuating element and the catch section of the first lock part it can be provided that by applying a compressive force onto the at least one catch locking element and removing the at least one catch locking element from the catch section the connection can be released. The compressive force can for example in a direction perpendicular to the fastening direction act on the catch locking elements and push the catch locking elements out of engagement with the catch section in such a way that the actuating element can, together with the second lock part, be pulled out of the recess of the first lock part counter to the fastening direction.

Alternatively it can also be provided that in the unloaded state the positive-locking connection between the at least one catch locking element of the actuating element and the catch section of the first lock part can be released by applying a tensile force onto the actuating element counter to the fastening direction. In the unloaded state then, by pulling the actuating element, the actuating element can in a simple manner be pulled out of the recess of the first lock part, without having to actuate the catch locking elements in a separate manner. For this purpose, the at least one catch locking element or the catch section can have for example a slope or a curve which is formed in such a way that, when a tensile force is acting on the actuating element counter to the fastening direction, the slope runs up onto the catch section and thereby the catch locking element is brought out of engagement with the catch section to release the positive-locking connection.

As the catch locking element has a slope or curve directed counter to the fastening direction, which, when the actuating element is pulled, runs up onto the catch section, for example the edge of a catch lock opening, the catch locking element is pushed out of engagement with the catch section when the actuating element is pulled and, consequently, the connection is released. This is possible because in the unloaded state, that is when no force is acting on the second lock part, the catch locking element is not blocked and can be brought out of engagement with the catch section. While in the loaded state the catch locking element is held positive-lockingly on the catch section, in the unloaded state the catch locking element can run up onto the catch section with its slope and is thereby pushed out of engagement with the catch section, so that the catch locking connection between the actuating element and the first lock part can be released and the second lock part can be taken out of the first lock part together with the actuating element.

Yet again, alternatively, it is also possible that in the unloaded state the positive-locking connection between the at least one catch locking element of the actuating element and the catch section of the first lock part can be released by turning the actuating element around the fastening direction relative to the first lock part or by shifting the actuating element transverse to the fastening direction. The underlying idea here is that the catch locking element is rigidly held on the catch section by the effect of the second lock part in the loaded state, but can be turned or shifted relative to the catch section in the unloaded state in such a way that the catch locking element does not come out of engagement with the catch section counter to the fastening direction, but instead in another way, that is to say transverse to the fastening direction.

For example, the catch locking element can be removed from the area of the catch section by turning or shifting the actuating element, so that the positive-locking engagement of the catch locking element with the catch section is terminated. It is equally possible that during the turning or shifting of the actuating element the catch locking element is pushed out of engagement with the catch section by a suitable slope on the catch locking element and/or in the area of the catch section, so that in this manner the positive-locking connection of the catch locking element to the catch section is terminated. Furthermore, it is also possible that the catch section is designed as a thread, which acts together with the at least one catch locking element in such a way that the actuating element is screwed out of the first lock part by turning.

Herein, the turning and shifting takes place in a direction perpendicular to the fastening direction, respectively, and causes a relative movement between the catch locking element of the actuating element and the catch section on the first lock part, as a result of which the catch locking element and the catch section come out of engagement and the actuating element can be detached from the first lock part together with the second lock part in another manner than it catch-lockingly engages upon closing.

In all the previously described embodiments restoring means can be provided to transfer the second lock part into an unblocked position relative to the actuating element in the unloaded state. The restoring means can here for example be formed mechanically by a spring or magnetically and act on the second lock part in such a way that in the unloaded state it is automatically guided back into a position in which it does not act blocking on the actuating element. The restoring means can for example provide a mechanical or magnetic pre-load between the second lock part and the actuating element. Alternatively, the second lock part can also be preloaded relative to the first lock part.

In another exemplary variant of the lock device restoring means can preferably return the blocking element to the blocked position. To open, the second lock part then first has to be brought into the unblocked position to be able to actuate the actuating element. This can offer an additional security against unintended opening in security-relevant applications.

In a further exemplary variant the second lock part can be catch-lockingly moved back and forth between the unblocked position and the blocked position by means of supplementary catch lockings between the second lock part and the actuating element.

In a further exemplary variant, multiple catch sections, axially offset relative to each other, are provided on the first lock part, so that the actuating element can be arranged on the first lock part in multiple different closing states—e.g. to re-tension a strap or to set the lock of a helmet to various lengths. All the closing states can be locked or unlocked depending on the load of the second lock part.

BRIEF DESCRIPTION OF THE DRAWINGS

The idea underlying the invention shall subsequently be further explained with the help of the exemplary embodiments illustrated in the figures. In the figures:

FIGS. 2A-2D show views of an embodiment of a lock device as defined by the present invention, in the loaded state;

FIGS. 3A-3D show views of the embodiment according to FIGS. 2A-2D, however, in the unloaded state;

FIGS. 4A-4D show views of a further embodiment of a lock device as defined by the present invention, in the loaded state;

FIGS. 5A-5D show views of the lock device according to FIGS. 4A-4D, however, in the unloaded state;

FIG. 7 shows a cross-sectional view of the lock device according to FIG. 6, however, in the unloaded state;

FIG. 8 shows a perspective exploded view of a further embodiment of a lock device;

FIGS. 14A-14D show views of a further embodiment of a lock device, having multiple closing states;

FIGS. 15A-15E show views of a further embodiment of a lock device, in which the second lock part and the actuating element are connected to each other in one piece via a blocking section, in different states; and FIGS. 16A-16I show views of a further embodiment of a lock device, in which the second lock part and the actuating element are connected to each other in one piece via a blocking section, in different states.

DETAILED DESCRIPTION OF THE INVENTION

Figure 1A:
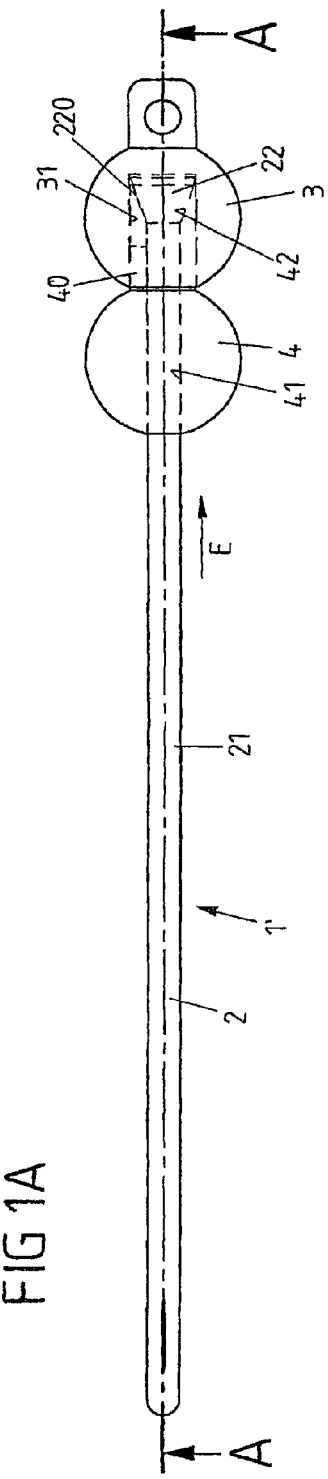
FIG. 1A shows a view of an embodiment of a lock device.
Figure 1B:
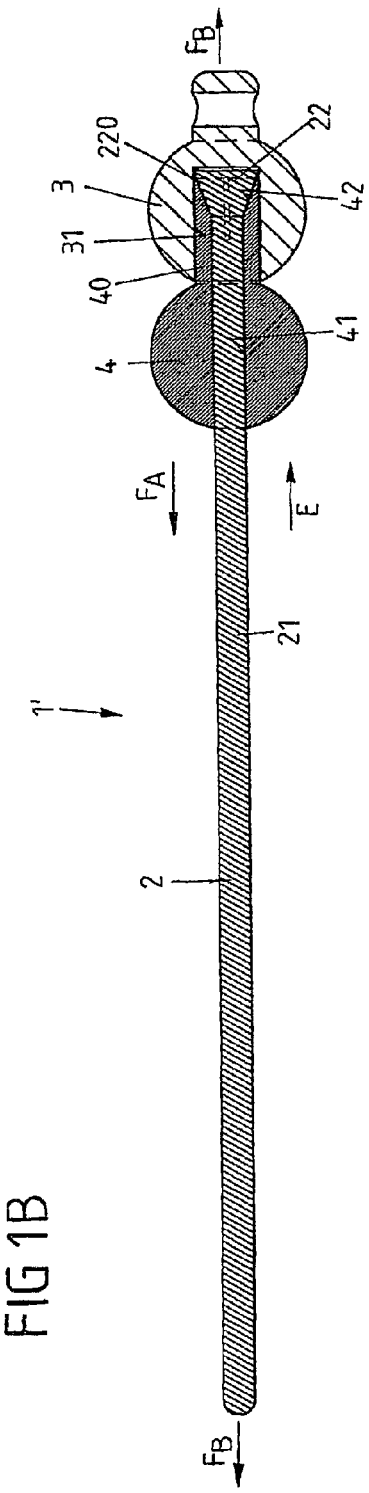
FIG. 1B shows a cross-sectional view through the lock device along the line A-A according to FIG. 1A.

FIGS. 1A and 1B show an embodiment of a lock device 1', in which a second lock part 2 is arranged on a first lock part 3 via an actuating element 4. FIGS. 1A and 1B here show the lock device 1' in its closing state, in which the second lock part 2 is connected to the first lock part 3 via the actuating element 4.

The lock device 1' illustrated in FIGS. 1A and 1B can be employed to connect two elements under tension, one of which is coupled with the first lock part 3 and a further one with the second lock part 2. In the closing state, when tensile forces FB act on the first lock part 3 and the second lock part 2, the first lock part 3 and the second lock part 2 are here rigidly connected to each other, so that the lock device 1' can absorb the acting tensile forces FB.

The lock device 1' can for example be employed to connect ropes or straps or also as closing device for a bag, a backpack or any other storage container or everywhere, where components are to be detachably connected to each other.

In the lock device 1' illustrated in FIGS. 1A and 1B the second lock part 2, which in the illustrated example is at least in sections formed rod-shaped and, correspondingly, has a rod-shaped section 21, is arranged shiftably on the actuating element 4 and for this purpose reaches through a guiding opening 41 of the actuating element 4. The actuating element 4 can herein be arranged on the second lock part 2 in such a way that it cannot slip from the second lock part 2.

On its end facing the first lock part 3 the second lock part 2 has a conically formed blocking section 22, which, with its conical shell surface, is designed to act together with a likewise conically shaped run-up slope in the end area of the guiding opening 41 of the actuating element 4.

To establish the connection of the second lock part 2 to the first lock part 1 the second lock part 2 is in a fastening direction E attached onto the first lock part 3 together with the actuating element 4 by inserting the actuating element 4 with a, for example, cylindrical section 40 into a correspondingly formed recess 31 on the first lock part 3. There is static friction between the section 40 and the recess 31 which, by corresponding surface characteristics of the section 40 and/or of the recess 31, can be adjusted in its properties and holds the actuating element 4 on the first lock part 3. Consequently, the second lock part 2 is connected to the first lock part 3 via the actuating element 4.

In a loaded state of the lock device 1' tensile forces FB act on the first lock part 3 and/or on the second lock part 2, which put the lock device 1' under tension. When tensile forces FB act between the first lock part 3 and the second lock part 2, the second lock part 2 moves counter to the fastening direction E at least by a small distance relative to the actuating element 4, which is here held on the first lock part 3 by static friction. Thereby, with a run-up slope 220 formed by its conical outer shell surface, the blocking section 22 runs up onto a run-up slope 42 on the end of the guiding opening 41 and consequently expands the section 40 in such a way that the section 40 is pressed against the inner wall of the recess 31 and the actuating element 4 is held friction-locking in the recess 31. In the loaded state the lock device 1' is consequently blocked, so that even great tensile forces FB can be absorbed.

To allow for the expanding of the section 40, the section 40 can be designed elastic at least in sections, for example in that elastic arms are designed on the section 40.

In the unloaded state, however, no or only small tensile forces FB act between the first lock part 3 and the second lock part 2. In this state the lock device 1' is not blocked, so that by actuating the actuating element 4 the connection of the first lock part 3 to the second lock part 2 can be released. For this purpose, by applying a tensile force FA counter to the fastening direction E, the actuating element 4 is pulled out of the recess 31, which is readily possible because the blocking section 22 does not pressingly act on the actuating element 4. Only the static friction between the section 40 and the recess 31, which is there without action of the blocking section 22, has to be overcome.

In qualification of the lock device 1' according to FIGS. 1A and 1B, FIGS. 2 to 7 show embodiments of lock devices 1, realizing the invention, in which the actuating element 4 is held catch-lockingly on the first lock part 3 in the closing state, wherein the catch locking connection between the actuating element 4 and the first lock part 3 is blocked in the loaded state of the second lock part 2, whereas it can be released in the unloaded state of the second lock part. As far as is useful, the same reference signs are here assigned to components with the same function.

In the first embodiment of the lock device 1 according to FIGS. 2A to 2D and 3A to 3D a second lock part 2 is catch-lockingly connected to a first lock part 3 via an actuating element 4 in a closing state. FIGS. 2B and 2C here show a side view and a top view of the lock device 1, FIG. 2A shows a sectional view along the line B-B according to FIG. 2B and FIG. 2D shows a sectional view along the line A-A according to FIG. 2C. FIGS. 2A to 2D show the lock device 1 in a loaded state, while in FIGS. 3A to 3D corresponding views of the lock device 1 in the unloaded state are illustrated.

In the lock device 1 according to FIGS. 2A to 2D and 3A to 3D the actuating element 4 is arranged in a recess 31 of the first lock part 3 with sections 40 in the form of locking arms, which are at least in sections formed elastic, when the second lock part 2 is connected to the first lock part 3 via the actuating element 4 in the closing state. Catch locking elements 400 are designed on the sections 40, which in this closing state positive-lockingly engage with catch lock openings 32, which form catch sections. In the closing state the actuating element 4 and the first lock part 3 are consequently positive-lockingly connected to each other.

In the closing state the lock device 1 can absorb also great tensile forces FB which are applied onto the first lock part 3 and the second lock part 2 via connecting brackets 23, 33 on the first lock part 3 and on the second lock part 2 to fasten e.g. ropes or straps. In the loaded state, when tensile forces FB act between the first lock part 3 and the second lock part 2, the lock device 1 is positioned in a blocking state, in which the catch-locking connection between the actuating element 4 and the first lock part 3 cannot be released and the second lock part 2 cannot be removed from the first lock part 3.

The second lock part 2 is mounted shiftably on the actuating element 4 and is for this purpose guided with a rod-shaped section 21 in a central guiding opening 41 and with an end section in the form of the holding bracket 23 in guiding openings 43 of the actuating element 4. The second lock part 3 can here be shifted relative to the actuating element 4 by a predetermined distance, it cannot, however, be taken away from the actuating element 4.

In the loaded state, illustrated in the views according to FIGS. 2A to 2D, the second lock part 2 shifts by the effect of the tensile force FB on the actuating element 4 and, with a blocking section 22, comes into contact with the catch locking elements 400. The blocking section 22, which is designed as an end section as a kind of head extending transverse to the direction of extension of the rod-shaped section 21, has run-up slopes 220 which, when a tensile force FB is acting on the second lock part 2, run up onto run-up slopes 42 formed on the rear side of the catch locking elements 400 in such a way that the catch locking elements 400 are positive-lockingly pressed into the catch lock openings 32 of the first lock part 3. The pressing here increases with an increasing tensile force FB on the second lock part 2, so that when the lock device 1 is loaded the catch locking elements 400 cannot be removed from the catch lock openings 32 and the lock device 1 is blocked. Thus, the second lock part 2 is securely connected to the first lock part 3 via the actuating element 4 and (in the loaded state) cannot become detached.

In the unloaded state, however, no or only small tensile forces FB act on the first lock part 3 and the second lock part 2. In this unloaded state, illustrated in FIGS. 3A to 3D, the blocking section 22 does not act blocking on the catch locking elements 400, so that the catch-locking connection of the catch locking elements 400 of the actuating element 4 to the catch lock openings 32 of the first lock part 3 can be released by applying a compressive force FD onto the catch locking elements 400 and the catch locking elements 400 can be pushed out of the catch lock openings 32. When the catch locking connection between the catch locking elements 400 and the catch lock openings 32 is released, the actuating element 4 can be taken out of the recess 31 of the first lock part 3 counter to the fastening direction E together with the second lock part 2.

In the unloaded state, consequently, opening the lock device 1 is possible in a simple manner, so that the second lock part 2 can be separated from the first lock part 3 and the lock device 1 can be opened.

An essential advantage of this lock device 1 is that the connection between the first lock part 3 and the second lock part 2 cannot become detached in the loaded state and thus an (unintended) opening of the lock device 1 in the loaded state is not possible. In the unloaded state, however, the lock device 1 can be opened in a simple and pleasant manner.

To ensure that in the unloaded state according to FIGS. 3A to 3D the second lock part 2 comes into a position in which the catch locking elements 400 are not blocked (as illustrated in FIG. 3A), the second lock part 2 can be pre-loaded relative to the actuating element 4 in such a way that in the unloaded state the second lock part 2 is pushed into the position illustrated in FIG. 3A for example by using a mechanical spring or by suitable magnetic means.

It is also conceivable to mechanically or magnetically preload the second lock part 2 relative to the first lock part 3, so that in the unloaded state the second lock part 2 is pulled toward the first lock part 3 into the unblocked position illustrated in FIG. 3A.

In the embodiment illustrated in FIGS. 2A to 2D and FIGS. 3A to 3D such a pre-load is not absolutely necessary, however, because in the unloaded state, when a compressive force FD is applied onto the catch locking elements 400, the second lock part 2 is pushed into the unblocked position by the effect of the run-up slopes 42, 220 and, consequently, the second lock part 2 does not stand opposed to opening the catch locking connection in the unloaded state.

It can, however, also be provided that restoring means return the second lock part into the blocked position. Then the lock device 1 indeed engages with more difficulty but also more securely, and the second lock part 2 does not have to move at all or only by a small distance when upon application of a load the second lock part 2 is transferred into the blocked position.

A modified embodiment of a lock device 1 is illustrated in FIGS. 4A to 4D in the loaded state and in FIGS. 5A to 5D in the unloaded state. The effective mode of action of the lock device 1 is here essentially identical to the lock device 1 according to FIGS. 2A to 2D and 3A to 3D. The only difference is in the design of the blocking section 22', which is formed rectangular in the embodiment illustrated in FIGS. 4A to 4D and 5A to 5D and has no run-up slope.

In the loaded state, illustrated in FIG. 4A, the blocking section 22' positive-lockingly lies in housing sections 42' on the rear side of the catch locking elements 400 and consequently blocks the catch locking elements 400 in such a way that they cannot be pushed inwards out of the catch lock openings 32. In the embodiment according to FIGS. 4A to 4D and FIGS. 5A to 5D the blocking section 22' consequently does not run up onto the catch locking elements 400 when loaded, but instead it lies positive-lockingly in housing sections 42' on the catch locking elements 401 and in this manner blocks the lock device 1.

In the unloaded state, illustrated in FIGS. 5A to 5D, the blocking section 22' is removed from the housing sections 42' of the catch locking elements 400, so that the catch locking elements 400 can be pushed out of the catch lock openings 32 by applying a compressive force FD and consequently the catch locking connection between the actuating element 4 and the first lock part 3 can be released.

To ensure that in the unloaded state the second lock part 2 comes into the unblocked position relative to the actuating element 4 (see FIG. 5A), a pre-load is expediently provided between the second lock part 2 and the actuating element 4 in a mechanical or magnetic manner in such a way that in the unloaded state the second lock part 2 is brought into the unblocked position, illustrated in FIG. 5A, the blocking section 22' comes out of engagement with the housing sections 42' of the catch locking elements 400 and the catch locking connection can be opened.

It is equally possible to pre-load the second lock part 2 relative to the first lock part 3 mechanically by using a spring or magnetically by using a magnet-anchor construction (with one magnet each on the first lock part 3 and on the second lock part 2, respectively, or on the one hand a magnet and on the other hand an anchor made of a ferromagnetic material), so that in the unloaded state the second lock part 2 is pulled into the unblocked position illustrated in FIG. 5A.

In an analogous manner, it can be provided to preload the second lock part 2 into the blocked position by suitable restoring means.

Figure 6:
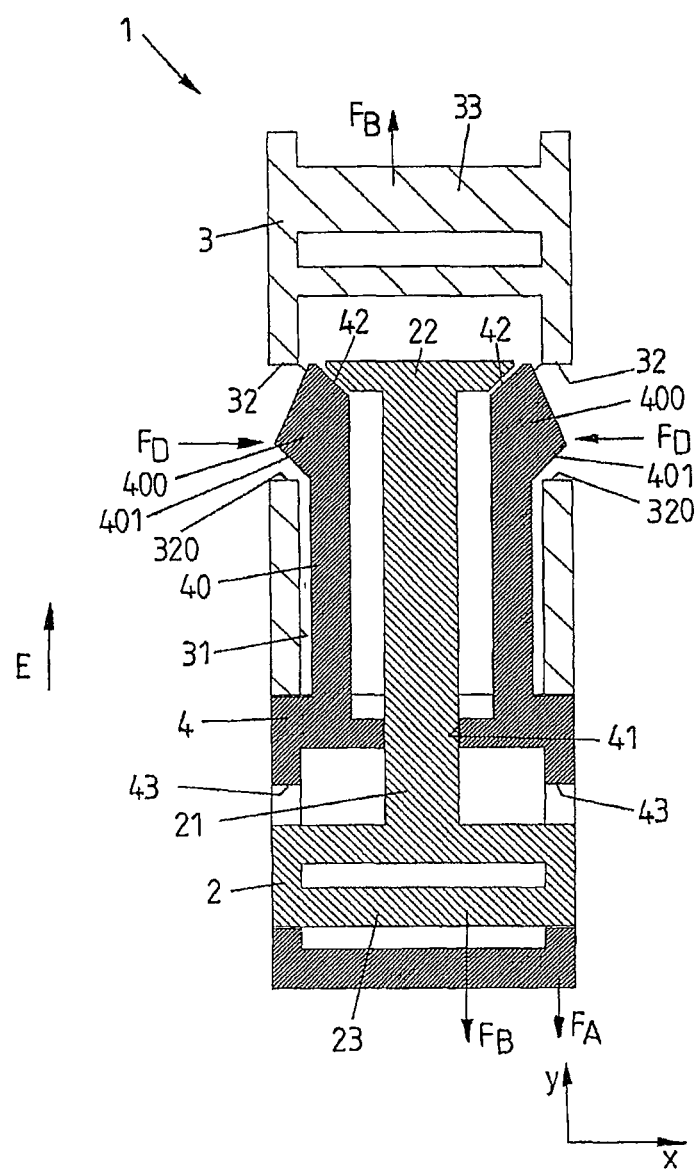
FIG. 6 shows a cross-sectional view of a modified embodiment of a lock device, in the loaded state.

In FIGS. 6 and 7 a modified embodiment of a lock device 1 is illustrated which differs from the embodiment according to FIGS. 2A to 2D and FIGS. 3A to 3D merely in that on the catch locking elements 400, on the sides facing the edge section 320 of the catch lock openings 32, slopes 401 are provided which have the effect that in the modified lock device 1 the actuating element 4 can in a simple manner be pulled out of the recess 31 of the first lock part 3 in the unloaded state by applying a tensile force FA counter to the fastening direction E and, consequently, the second lock part 2 can be detached from the first lock part 3. Applying a compressive force FD transverse to the fastening direction E onto the catch locking elements 400 is not required, so that the handling to open the lock device 1 is further facilitated.

FIG. 6 shows the lock device 1 here in the loaded state, in which the lock device 1 is blocked by the combined action of the blocking section 22 of the second lock part 2 with the catch locking elements 400 of the actuating element 4. In this state the catch locking elements 400 cannot be removed from the catch lock openings 32, because an inward movement of the catch locking elements 400 is blocked by the blocking section 22 of the second lock part 2.

In the unloaded state, however, illustrated in FIG. 7, the catch locking elements 400 are not blocked, so that when a tensile force FA is applied onto the actuating element 4 the catch locking elements 400 run up onto the, in FIG. 7, lower edge section 320 of the catch lock openings 32 with their slopes 401 and in this manner are pushed out of the catch lock openings 32. By applying the tensile force FA the actuating element 4 and, together with the actuating element 4, the second lock part 2 can consequently be pulled out of the recess 31 of the first lock part 3.

Obviously, such a modification can also be provided in the embodiment according to FIGS. 4A to 4D and FIGS. 5A to 5D, in that slopes 401 are formed on the catch locking elements 400.

Instead of the slopes 401, the catch locking elements 400 can also be rounded, so that the catch locking elements 400 run up onto the edge section 320 of the catch lock openings 32 by the effect of the tensile force FA. It is essential here, that in the unloaded state the catch locking elements 400 are no longer held completely positive-locking in the catch lock openings 32 on the first lock part when tension is acting on the actuating element 4 counter to the fastening direction E, but only partially positive-locking.

FIGS. 15A to 15E show a further exemplary embodiment of a lock device 1, which in comparison to the lock device 1 according to FIGS. 6 and 7 is particularly modified to the effect that in the lock device 1 according to FIGS. 15A to 15E a second lock part 2 is connected to an actuating element 4 in one piece via blocking sections 22" and is thus designed in one piece with the actuating element 4 for example as a plastic moulded part.

Figure 15A:
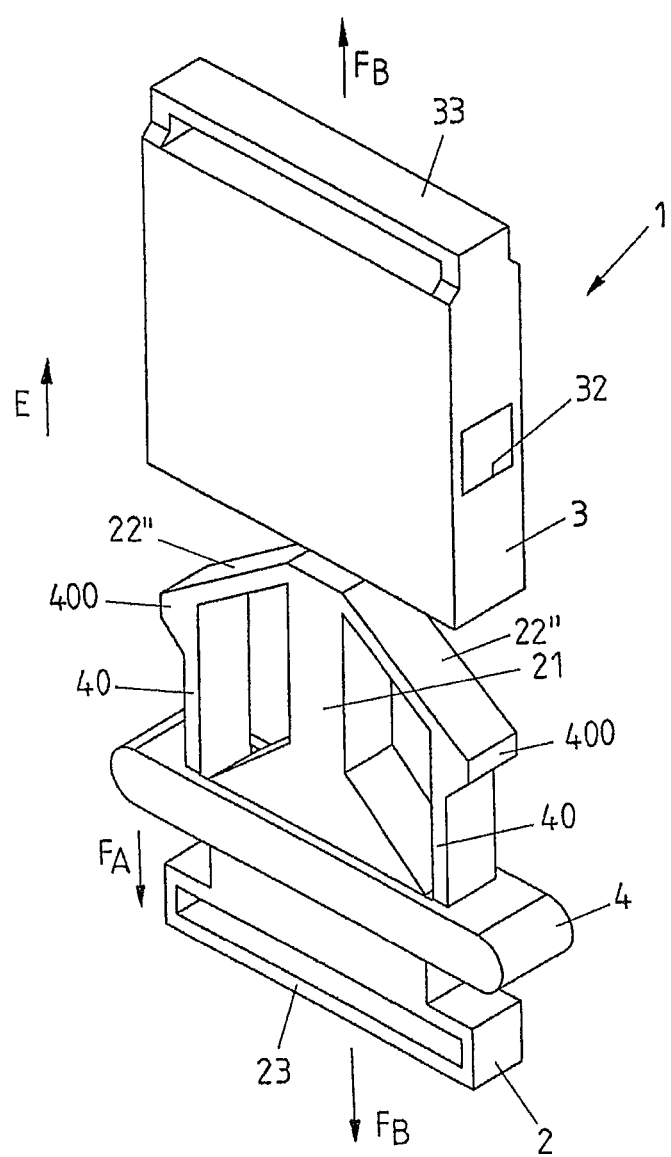

FIGS. 15A to 15E show the lock device 1 in different states. That is, FIG. 15A shows the lock device 1 in the opened state in a perspective view, FIG. 15B shows the lock device 1 in the closed state in a side view, FIG. 15C shows the lock device 1 in the closed state in a sectional view along the line A-A according to FIG. 15B, FIG. 15D shows the lock device in a side view upon opening and FIG. 15E shows the lock device 1 in a cross-sectional view along the line A-A according to FIG. 15D upon opening.

In the exemplary embodiment in FIGS. 15A to 15E the same reference signs are—as far as it is useful—assigned to components with the same function.

In the exemplary embodiment according to FIGS. 15A to 15E the second lock part 2 is via a rod-shaped section 21 and via blocking sections 22", which are flexible at least in sections, connected to likewise at least in sections flexible sections 40 of the actuating element 4 and here shiftably guided in a guiding opening 41 on the actuating element 4 (see for example FIG. 15 C). Catch locking elements 400 are arranged on the sections 40 of the actuating element 4, which are designed to engage with catch lock openings 32 of a first lock part 3 in a closing state.

In the closing state, illustrated in FIGS. 15B and 15C, the second lock part 2 is arranged in a recess 31 of the first lock part 3 together with the actuating element 4, wherein the catch locking elements 400 are positive-lockingly engaged with the catch lock openings 32 (see in particular the cross-sectional view according to FIG. 15C).

When in the closing state, illustrated in FIG. 15C, tensile forces FB (for example via ropes or straps, which act on a connecting bracket 23 of the second lock part 2 and a connecting bracket 33 of the first lock part 3) act on the second lock part 2 and the first lock part 3 in such a way that the second lock part 2 is loaded counter to the fastening direction E (see FIG. 15A) relative to the first lock part 3, the second lock part 2 acts on the catch locking elements 400 of the actuating element 4 via the blocking sections 22", so that the catch locking elements 400 are pushed outwards in the direction of the arrow, indicated in FIG. 15C, and thus into engagement with the catch lock openings 32. The lock device 1 is consequently blocked: in the loaded state the second lock part 2 cannot be removed from the first lock part 3.

When, however, in the unloaded state of the lock device 1 (in which no or only small tensile forces FB act between the first lock part 3 and the second lock part 2) a tensile force FA, as illustrated in FIG. 15E, is exerted on the actuating element 4 counter to the fastening direction E, the catch locking elements 400 are in the direction of the arrow, indicated in FIG. 15E, impacted inwards via the sections 40 of the actuating element 4, which are elastic at least in sections, and thus in the direction of a release from the catch lock openings 32 of the first lock part 3, so that the actuating element 4 and, together with the actuating element 4, the second lock part 2 can be taken out of the recess 31 of the first lock part 3 and thus the lock device 1 can be released.

As evident from FIG. 15E, the catch locking elements 400 are bevelled counter to the fastening direction E, so that they can slide out of the catch lock openings 32 in an easy manner when the actuating element 4 is actuated by applying a tensile force FA counter to the fastening direction E and thus the lock device 1 can be released.

In an exemplary embodiment of a lock device 1, modified compared with the exemplary embodiment according to FIGS. 15A to 15E, illustrated in FIGS. 16A to 16I in different states, no catch locking elements 400 on the actuating element 4 and no catch lock openings 32 on the first lock part 3 are provided, but instead the second lock part 2 is in the loaded state held on the first lock part 3 together with the actuating element 4 by friction locking. The structure and also the manner of operation are otherwise identical to how it has previously been described for the exemplary embodiment according to FIGS. 15A to 15E.

Figure 16A:
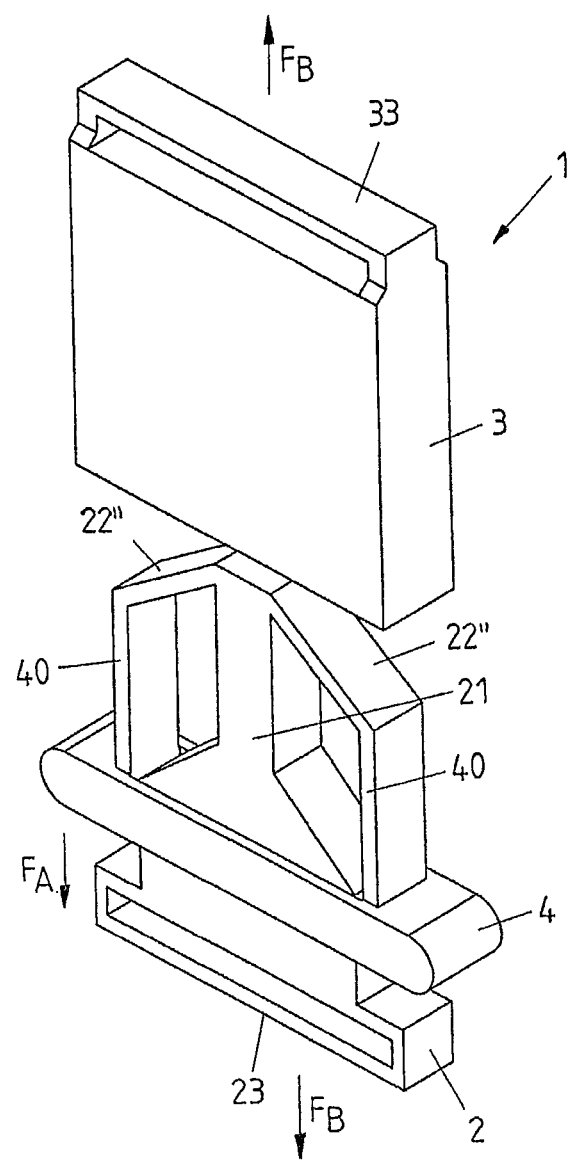
Figure 16D:
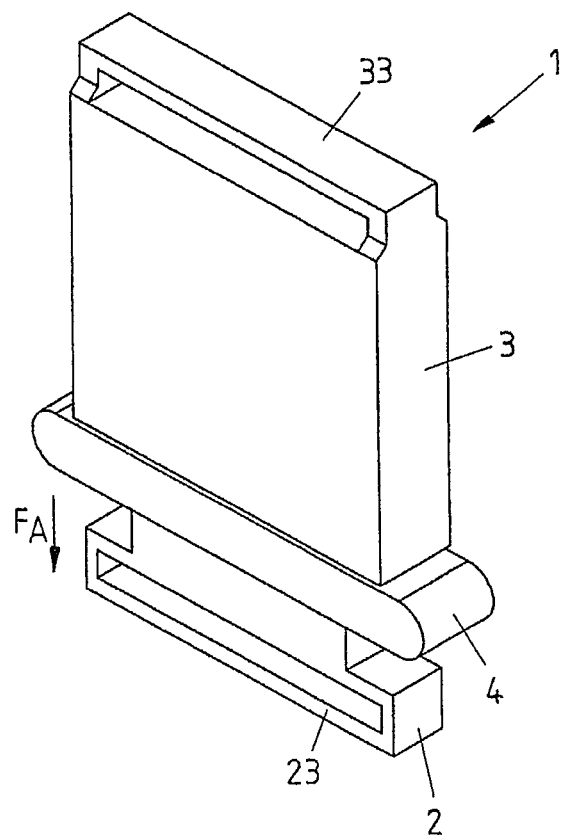
Figure 16G:
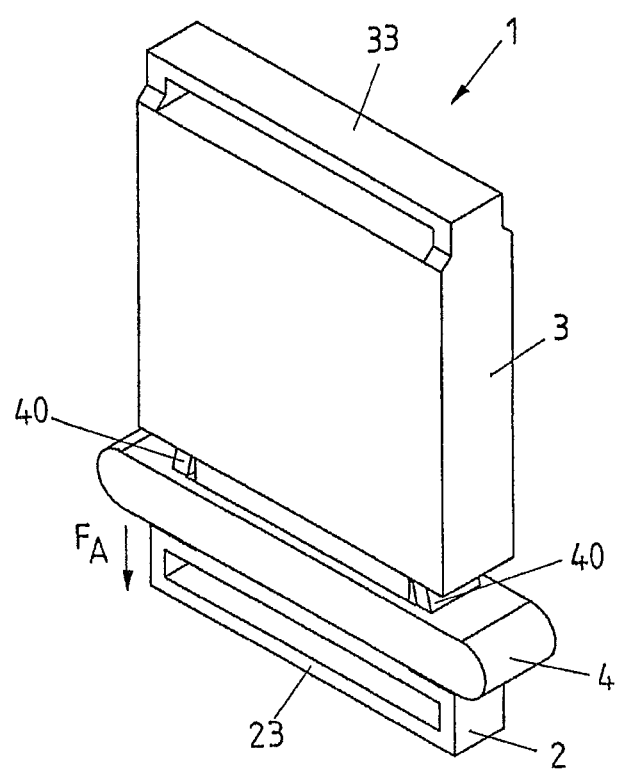

FIGS. 16A to 16C show the lock device 1 in the opened state in different views, FIGS. 16D to 16F in the closing state and FIGS. 16G to 16I upon opening. FIGS. 16F and 16I each show cross-sectional views here along the line A-A according to FIG. 16E or according to FIG. 16H.

In the closing state, illustrated for example in FIG. 16F, the second lock part 2 and the actuating element 4 lie via sections 40 friction-lockingly against the inner wall of the recess 31 of the first lock part 3, wherein on account of the friction locking the second lock part 2 and the actuating element 4 cannot readily slide out of the recess 31 of the first lock part 3.

When the second lock part 2 is loaded by tensile forces FB compared with the first lock part 3 counter to the fastening direction E, the sections 40 are pushed outwards in the direction of the arrow, indicated in FIG. 16F, by the effect of the blocking sections 22" and, consequently, into friction locking with the inner wall of the recess 31 of the first lock part 3, so that the second lock part 2 is self-lockingly held in friction in the recess 31 of the first lock part 3.

When in the unloaded state, however, the actuating element 4 is actuated by applying a tensile force FA counter to the fastening direction E to open the lock device 1, as illustrated in FIG. 16I, the sections 40 of the actuating element 4 are loaded inwards in the direction of the arrow indicated in FIG. 16I and thus brought out of friction locking with the inner wall of the recess 31 of the first lock part 3, so that the second lock part 2 can be taken away from the first lock part 2 together with the actuating element 4.

The blocking sections 22" of the exemplary embodiments according to FIGS. 15A to 15E and 16A to 16I are connecting arms, flexible in sections but rigid in compression, which connect the rod-shaped section 21 of the second lock part 2 to the sections 40 of the actuating element 4 which are likewise flexible in sections and rigid in compression. The blocking sections 22", designed as a kind of spreading arm, are here each arranged at an angle of less than 90° to the fastening direction E and of more than 90° to the allocated section 40 of the actuating element 4.

Under a load acting on the second lock part 2 counter to the fastening direction E the angle to the fastening direction E is increased and correspondingly the angle to the allocated section 40 is reduced, so that the respective allocated section 40 of the actuating element 4 is pushed outwards to push the catch locking elements 400 into engagement with the catch lock openings 32 and, accordingly, to push the sections 40 into friction-locking contact with the inner wall of the recess 31.

By the same token, when the actuating element 4 is actuated the angle to the fastening direction E is reduced and correspondingly the angle to the allocated section 40 is increased, so that the respective allocated section 40 of the actuating element 4 is impacted with force inwards, so that the catch locking elements 400 can be brought out of engagement with the catch lock openings 32 and, accordingly, the sections 40 can be brought out of friction locking with the inner wall of the recess 31.

The blocking sections 22" can be designed in one piece with the actuating element 4 and with the second lock part 2 for example as a plastic moulded part.

In this context, however, a multiple-piece design of the actuating element 4, the blocking sections 22" and the second lock part 2 is also conceivable. The blocking sections 22" can here for example be connected by joints on the one hand to the rod-shaped section 21 of the second lock part 2 and on the other hand to the respective allocated section 40 of the actuating element 4. The blocking sections 22" can in this case for example be manufactured as elements made of metal which are rigid in compression.

Figure 9A:
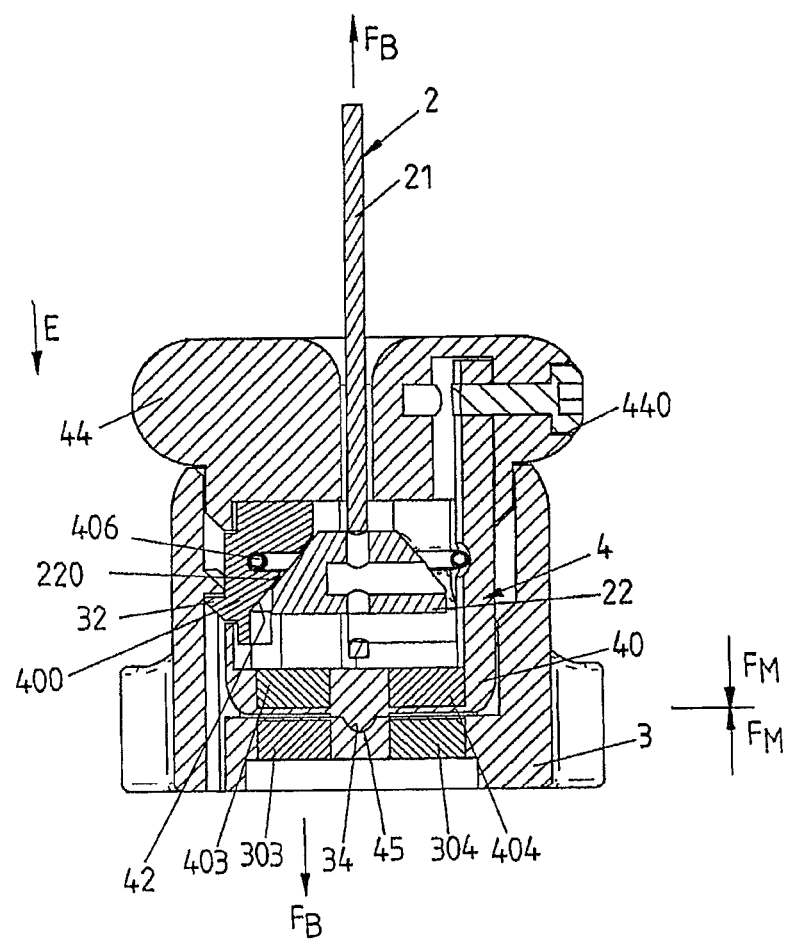
FIG. 9A shows a sectional view of the lock device along the line A-A according to FIG. 8, in the loaded state.
Figure 9B:
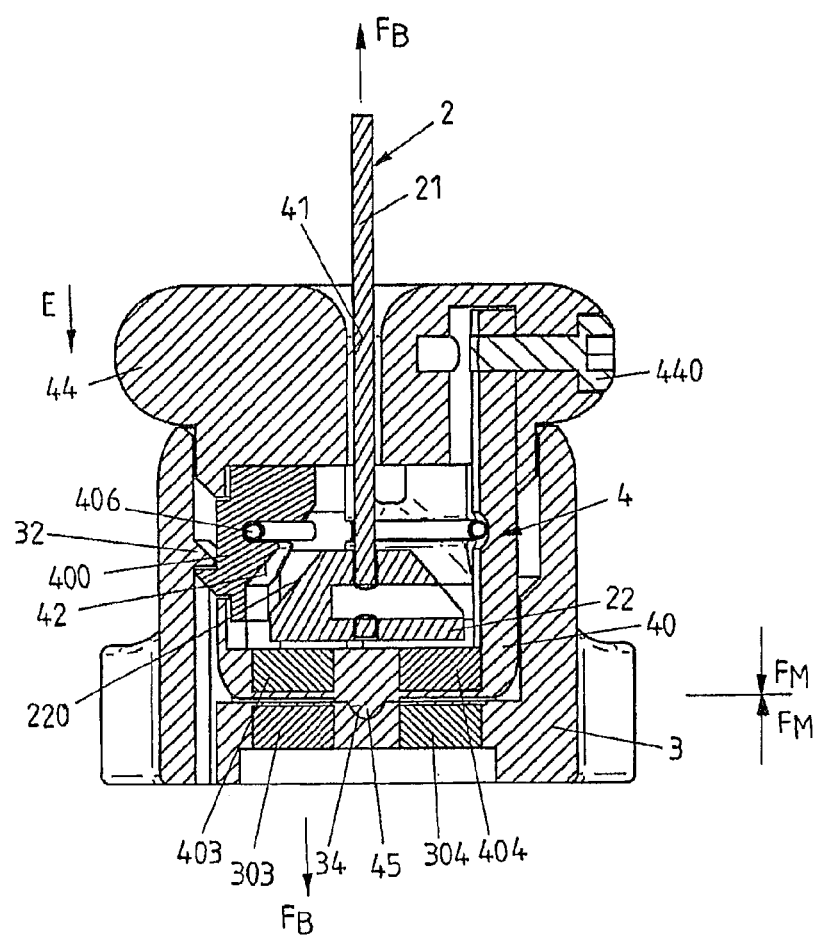
FIG. 9B shows a sectional view of the lock device along the line A-A according to FIG. 8, in the unloaded state.
Figure 10A:
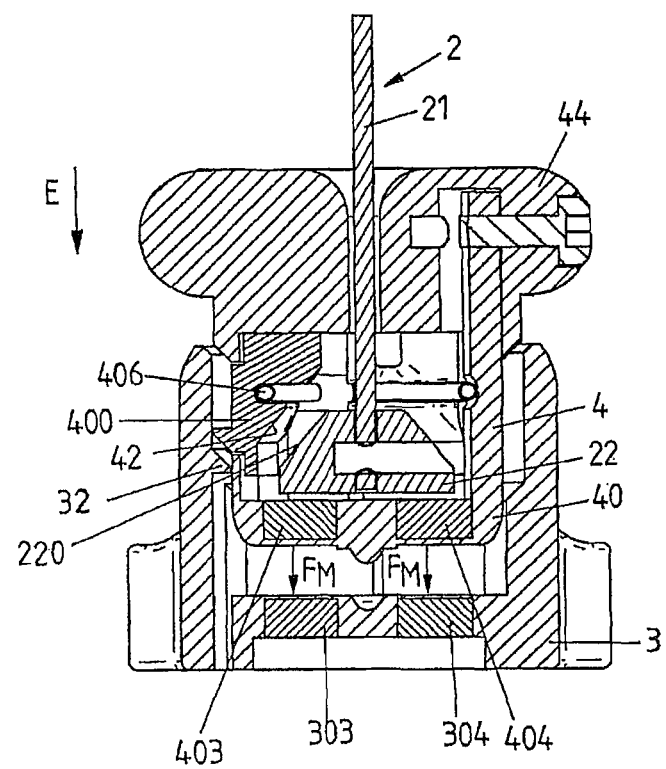
FIG. 10A shows a sectional view of the lock device along the line A-A according to FIG. 8, upon closing.
Figure 10B:
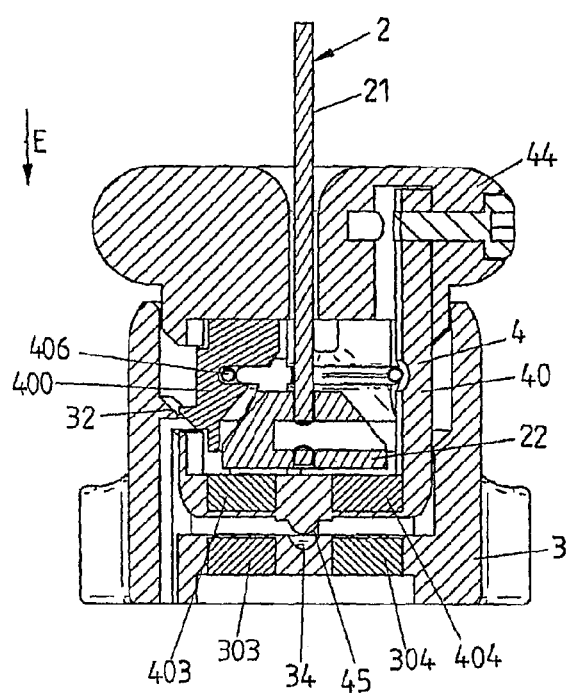
FIG. 10B shows a sectional view of the lock device along the line A-A according to FIG. 8, upon closing.
Figure 10C:
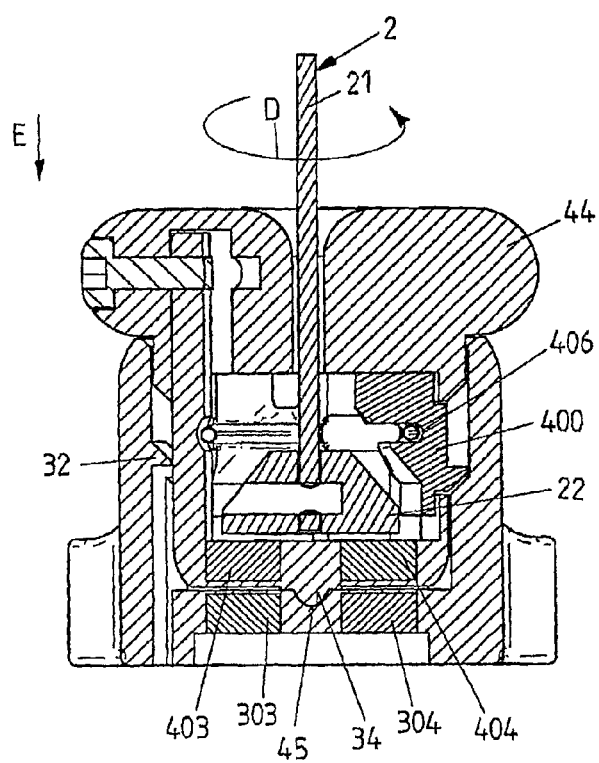
FIG. 10C shows a sectional view of the lock device along the line A-A according to FIG. 8, upon opening.

FIGS. 8 to 10 show an embodiment of a lock device 1, in which the actuating element 4 can be detached by a turning relative to the first lock part 3. FIG. 8 here shows a perspective exploded view, FIG. 9A shows the lock device 1 in a closing state under load, FIG. 9B in the closing state, however, unloaded, FIGS. 10A and 10B upon establishing the closing state and FIG. 10C upon opening. Yet again, the same reference signs are assigned to components with the same function as specified previously, as far as it is useful.

As it is illustrated in the perspective exploded view according to FIG. 8, the lock device 1 has an actuating element 4, made of a head 44 and a section 40 which is cylindrical in its outer contour, on which the second lock part 2 is arranged and which can be inserted into a recess 31 on the first lock part 3 in the fastening direction E to establish the closing state of the lock device 1.

Catch locking elements 400 are movably arranged on the actuating element 4 radial to the fastening direction E, which come to lie in recesses 402 on the section 40 in the assembled state of the actuating element 4. As evident for example from the sectional view according to FIG. 9A, the catch locking elements 400 are pre-loaded in radial direction via a spring 406.

To assemble the actuating element 4, the head 44 can be connected to the section 40 via screws 440, wherein for this purpose the screws 440 reach through the head 44 on openings 441 and engage in housings 442 on the section 40.

As evident for example from the sectional view according to FIG. 9A, a blocking section 22 of the second lock part 2, conical in its outer contour, is arranged inside of the section 40 which is connected to a, for example flexible, section 21 in the form of a means of tension. The section 21 reaches through the head 44 of the actuating element 4 on a guiding opening 41 and serves to connect the second lock part 2, made of the blocking section 22 and the section 21, to an element which is to be connected, for example a rope or a strap.

Three catch sections 32, each in the form of a saw-tooth, are arranged on the recess 31 of the first lock part 3, which each extend over an angle range of less than 60° in circumferential direction within the recess 31 and are designed to enter into engagement with one catch locking element 400 of the actuating element 4, respectively.

FIG. 9A shows the lock device 1 in the closing state under load, in which a tensile force FB acts on the second lock part 2 and tensions the second lock part counter to the fastening direction E relative to the first lock part 3. As is evident in the view according to FIG. 9A, the catch locking element 400 is in positive-locking engagement with the catch section 32 of the first lock part 3 in the closing state, so that the actuating element 4 is held positive-locking on the first lock part 3. Via the blocking section 22 the second lock part 2 is at the same time held on the actuating element 4, so that the second lock part 2 is connected to the first lock part 3.

Similar to how it has previously been described with respect to the other embodiments, in the loaded state according to FIG. 9A the second lock part 2 lies against the three catch locking elements 400 with its blocking section 22, wherein the conically formed blocking section 22 runs up onto run-up slopes 42 on the rear side of the catch locking elements 400 with its outer shell surface 220, which forms a run-up slope, and pushes said outer shell surface 220 radially outwards, so that the catch locking elements 400 cannot come out of engagement with the catch sections 32 on the first lock part 3.

In suitable execution, this radial pushing-outwards can result in different advantages:
- it can serve to secure catch locking elements 400 which are as smooth-running as possible, i.e. pre-loaded with a weak spring 406, and
- it can prevent an unintended rotating of the actuating element 400 by friction locking or positive locking.

In the unloaded state according to FIG. 9B the blocking section 22 does not lie in contact with the catch locking elements 400 so that these are not blocked in the radial direction.

FIGS. 10A and 10B show the lock device 1 upon establishing the closing state. For this purpose, as illustrated in FIG. 10A, the actuating element 4 is in the fastening direction E inserted into the recess 31 of the first lock part 3 together with the second lock part 2. Upon establishing the closing state the blocking section 22 of the second lock part is positioned in an unlocked position in which the blocking section 22 is not in contact with the catch locking elements 400, so that these can move inwards radial to the fastening direction E. To ensure that upon establishing the closing state the blocking section 22 is indeed in the unlocked position, a pre-load of the blocking section 22 relative to the actuating element 4 can be provided, wherein this pre-load can be executed mechanically by using a spring or also magnetically by using magnets.

As illustrated in FIG. 10A, two magnets 403, 404 are arranged on the actuating element 4, namely on the front side of the section 40 facing the bottom of the recess 31, which support the closing process together with magnets 303, 304 on the bottom of the recess 31 of the first lock part 3. This takes place because the magnets 303, 403 and, accordingly, 304, 404 are polarized in such a way that they attract each other, respectively. In this manner, a magnetic force is generated which acts in the fastening direction E and creates an attracting force FM on the actuating element 4 into the recess 31 of the first lock part 3.

As evident from FIG. 8, the magnets 303, 304, 403, 404 are each designed sickle-shaped, wherein the magnets 403, 404 are arranged and fixed in housings 405 on the actuating element 4 and the magnets 303, 304 are arranged and fixed in corresponding housings (not visible in FIG. 8) on the first lock part 3.

On the one hand, the magnets 303, 304, 403, 404 have the purpose to support the closing process by creating a magnetic attracting force FM in the direction of the fastening direction E, wherein the magnetic attracting force FM can be greater than the friction forces occurring between the actuating element 4 and the first lock part 3 and the spring force of the spring 406, so that the closing process essentially takes place automatically.

On the other hand, the magnets 303, 304, 403, 404, due to their arrangement and polarity, have the effect that to establish the closing state the actuating element 4 automatically rotates into such a position, in which the catch locking elements 400 on the actuating element 4 can come into engagement with the catch sections 32 on the first lock part 3. The underlying idea here is that the catch sections 32 cover only specific angle ranges of the circumference of the recess 31, so that the actuating element 4 has to be inserted into the recess 31 in a specific turning position to be able to positive-lockingly lock with the first lock part 3. It is ensured by the arrangement and the polarity of the magnets 303, 304, 403, 404 that the actuating element 4 automatically assumes the desired turning position to establish the closing state, in that the magnets 303, 304, 403, 404 turn the actuating element 4 into the required position relative to the first lock part 3 by means of the acting magnetic forces.

When the actuating element 4, as illustrated in FIG. 10B, is inserted into the recess 31 on the first lock part 3 with the support of the magnets 303, 304, 403, 404, the catch locking elements 400 move radially inwards and slide along the sawtooth-shaped catch sections 32 until the actuating element 4 is entirely inserted into the recess 31 on the first lock part 3 with its section 40. This closing state is illustrated in FIGS. 9A and 9B.

A point bearing 45 is arranged on the underside of the section 40, which comes to lie in a corresponding supporting point 34 on the bottom of the recess 31 in the closing state and has the effect that in the closing state the actuating element 4 rests axially punctiform opposite to the first lock part 3. The actuating element 4 and the first lock part 3 therefore do not lie flatly on top of each other on their front-side planes facing each other, so that between the magnets 303, 304 on the one hand and 403, 404 on the other hand a predetermined distance is maintained. In this manner, an axial pivot bearing is created, which allows for a low-friction turning of the actuating element 4 within the recess 31 relative to the first lock part 3.

To open the lock device 1 the actuating element 4 is turned in a turning direction D in the recess 31 of the first lock part 3, as illustrated in FIG. 10C, so that the catch locking elements 400 move in circumferential direction relative to the catch sections 32 of the first lock part 3 until they come out of engagement with the catch sections 32. This is possible because the catch locking elements 400 and the catch sections 32 each cover an angle range of less than 60°, so that between the individual catch sections 32 in angle ranges of more than 60° circumferentially no catch-locking elements are present on the recess 31 and the actuating element 4 is no longer held positive-locking in the recess 31 when the catch locking elements 400 are turned into these areas and can be taken out of the recess 31 of the first lock part 3.

Detents can be provided on the actuating element 4 and/or on the recess 31 in such a way that a turning of the actuating element 4 relative to the recess 31 is possible by exactly the required angle to bring the catch locking elements 400 out of engagement with the catch sections 32.

By turning the actuating element 4, at the same time the magnets 303, 304 on the one hand and 403, 404 on the other hand are also turned relative to each other, so that the magnets 303, 403 and 304, 404, allocated to each other, no longer stand attracting frontally opposite to each other, but instead are turned relative to each other. By turning the magnets 303, 304, 403, 404 relative to each other the magnetic attracting force, acting between the magnets 303, 304, 403, 404, is weakened or even reversed into a force of repulsion (when after the turning the magnets 303, 304, 403, 404 stand opposite each other with like poles at least in sections, see FIG. 10O), so that to open the lock device 1 only a small magnetic force needs to be overcome or the magnetic force even repulsively supports the opening process.

It is also conceivable to design the lock device in such a way that the actuating element 4 can be brought out of engagement with the first lock part 3 by shifting (and not by turning) transverse to the fastening direction E.

In yet another embodiment it is also possible to provide run-up slopes on the recess in such a way that upon a turning or shifting transverse to the fastening direction E the catch locking elements 400 run up onto these run-up slopes and are thereby pushed radially inwards and out of engagement with the catch sections 32.

In yet another embodiment the catch sections 32 can also be designed as a kind of thread, wherein by turning the actuating element 4 in the recess 31 the catch locking elements 400 can be guided along the thread and be screwed out of engagement with the thread.

Figure 13A:
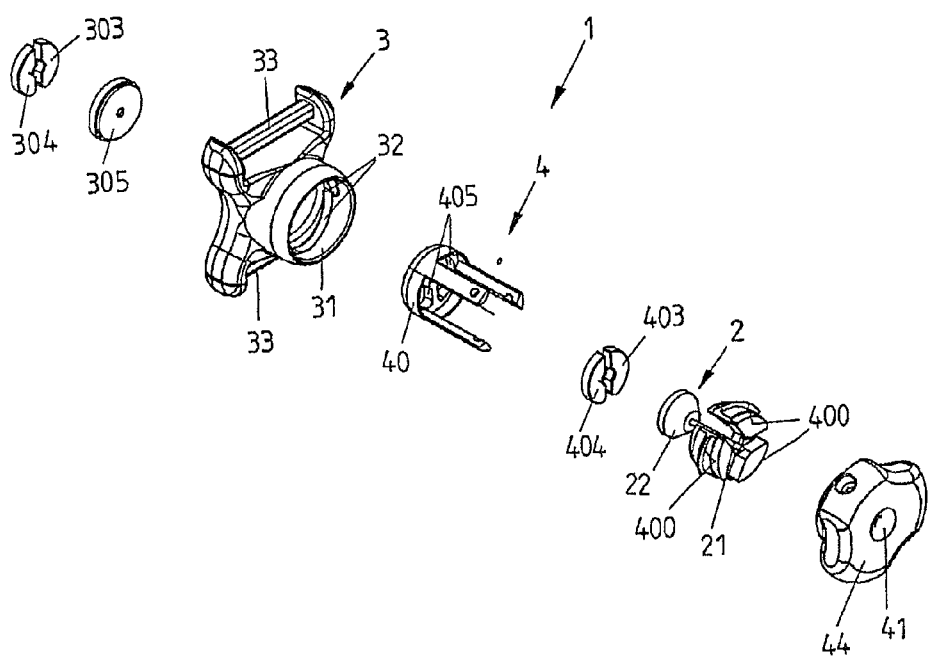
FIGS. 13A-13C show views of a further embodiment of a lock device, in which the catch sections are designed thread-shaped.
Figure 13B:
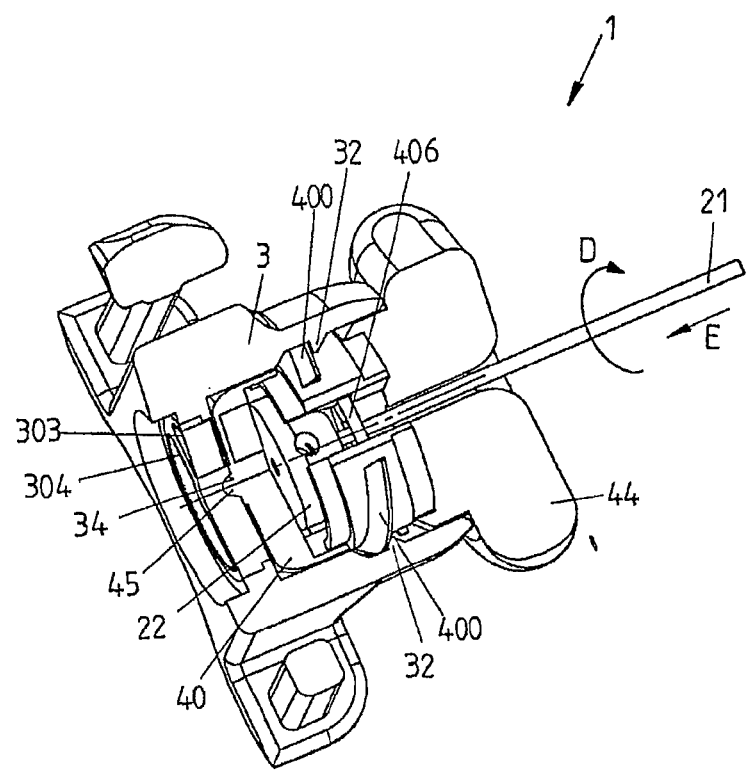
Figure 13:
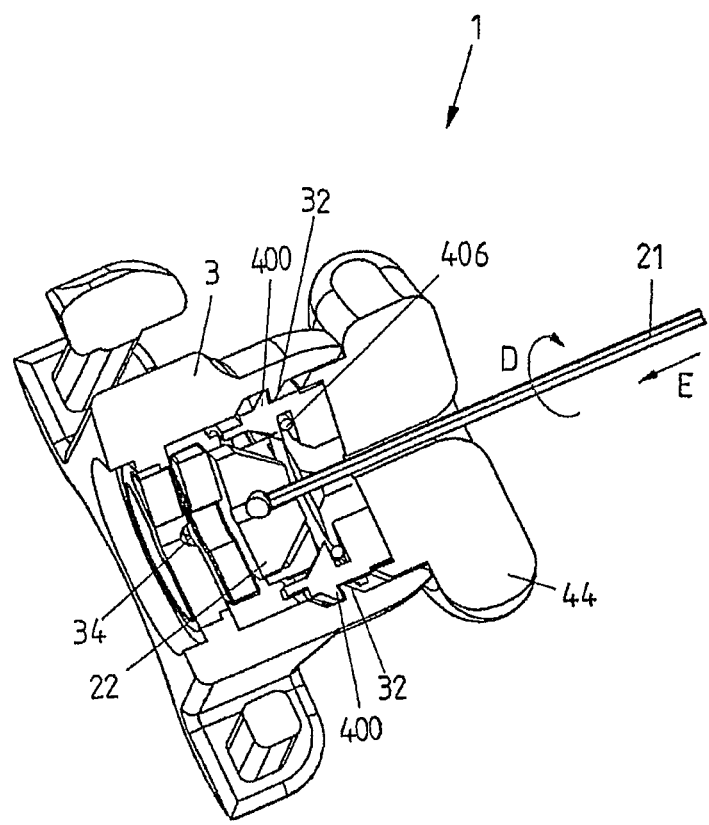

Such an embodiment, modified compared with the embodiment according to FIGS. 8 to 10, in which the catch sections 32 are designed as a kind of thread in the recess 31 of the first lock part 3, is illustrated in FIGS. 13A to 13C. Herein, three catch sections 32 are provided which run circumferentially in the recess 31, wherein a catch section 32 is allocated to each catch locking element 400 of the actuating element 4. The catch locking elements 400 have catch sections, adjusted to the thread, which in the closing state engage positive-lockingly with the catch sections 32 in the recess 31.

Analogous to the embodiment according to FIGS. 8 to 10, also in the embodiment according to FIGS. 13A to 13C magnets 303, 304 are arranged via a bottom plate 305 on the first lock part 3 and magnets 403, 404 are arranged via housings 405 on the actuating element 4 which support establishing the closing state.

As is evident in the perspective views according to FIGS. 13B and 13C, the lock device 1 can be released in that the actuating element 4 is turned relative to the first lock part 3 in the turning direction D and thereby the catch locking elements 400 run along the thread-shaped catch sections 32 and come out of engagement with the catch sections 32. As the actuating element 4 is screwed out of the recess 31 in this manner, the connection of the first lock part 3 to the second lock part 2 can be released.

Yet again, when loaded, the blocking section 22 stands in contact with the catch locking elements 400 and in this manner blocks the lock device 1 by establishing a friction locking or a positive locking of the catch locking elements 400 with the first lock part 3.

Figure 11:
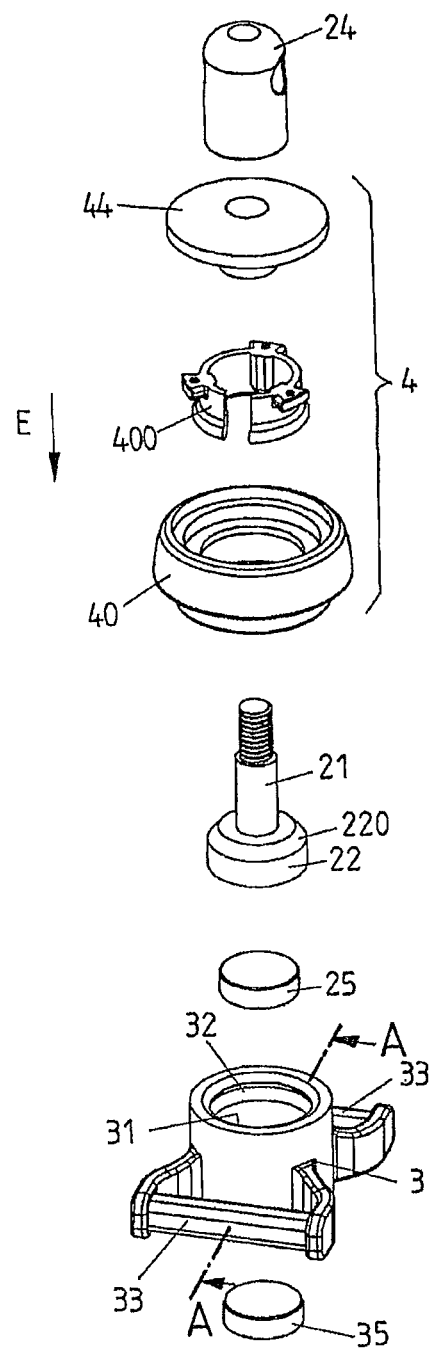
FIGS. 11A, 11B show exploded views of a further embodiment of a lock device.
Figure 12A:
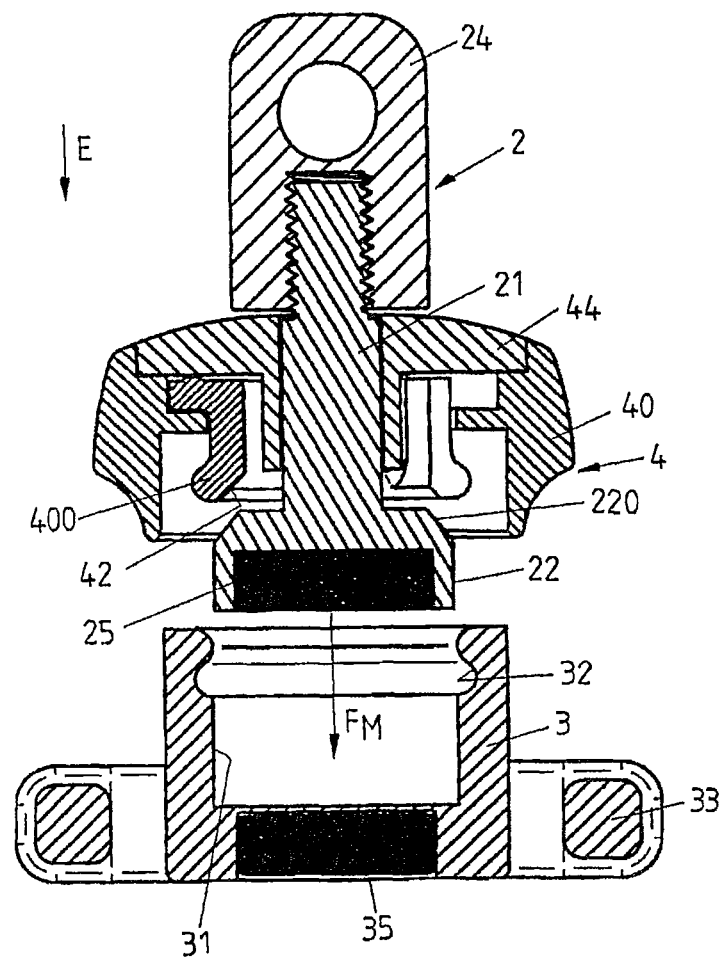
FIGS. 12A-12D show sectional views of the lock device along the line A-A according to FIG. 11A upon closing and in the closed state in the unloaded as well as the loaded state.
Figure 12B:
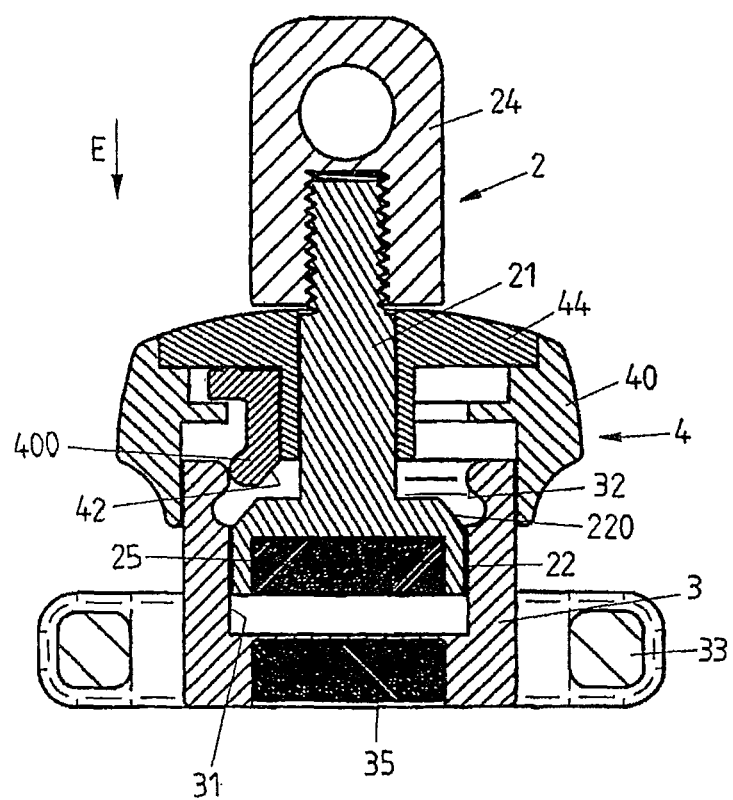
Figure 12C:
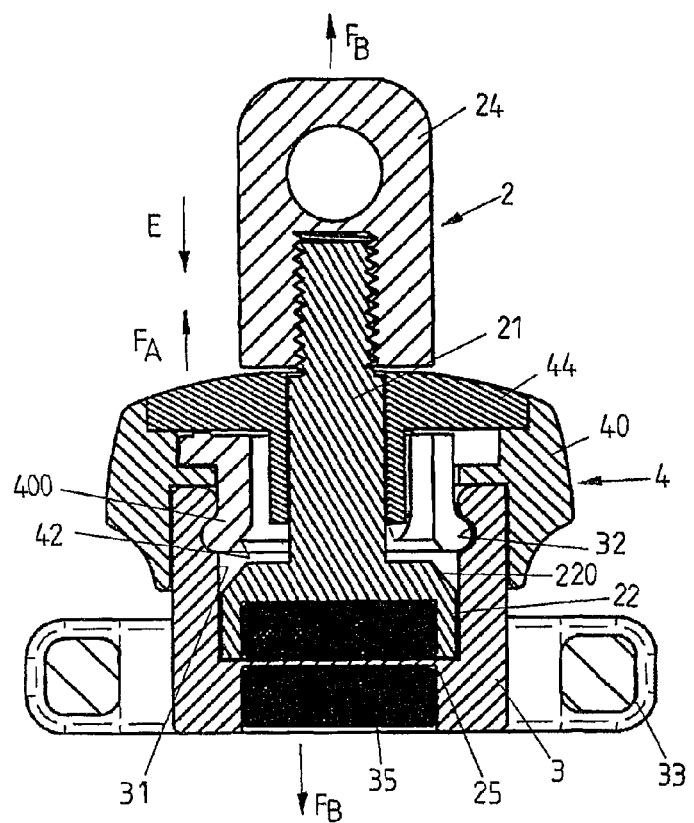
Figure 12D:
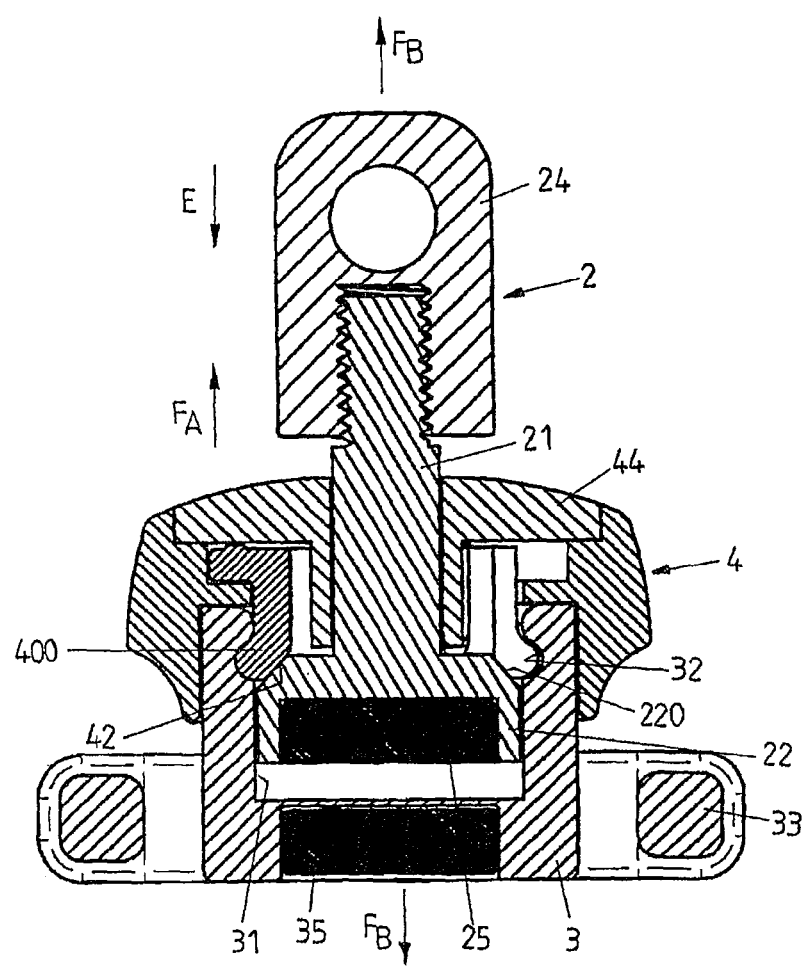

A further embodiment of a lock device 1 is illustrated in FIGS. 11A, 11B and FIGS. 12A to 12D. FIGS. 11A and 11B show two different exploded views here, while FIGS. 12A to 12D illustrate the lock device 1 upon establishing the closing state (FIGS. 12A, 12B), in the closing state without load (FIG. 12C) and in the closing state with load (FIG. 12D).

The embodiment of the lock device 1 illustrated in FIGS. 11 and 12 is in its effective mode of action basically analogous to the embodiment illustrated in FIGS. 6 and 7 and specified previously. In the embodiment according to FIGS. 11 and 12, magnets 25, 35 are additionally provided on the one hand on the second lock part 2 and on the other hand on the first lock part 3 which support the establishing of the closing state in a magnetic manner.

In the embodiment according to FIGS. 11 and 12 the second lock part 2 is formed by a blocking section 22 which is connected to a head 24 via a cylindrical, rod-shaped section 21. The section 21 reaches through the actuating element 4, consisting of a head 44, a cylindrical section 40 and a catch locking element 400 in the form of a ring which is opened in sections. With the head 24 it is ensured that the second lock part 2 cannot slip from the actuating element 4.

To establish the closing state, the actuating element 4, with the second lock part 2 arranged thereupon, is inserted into the recess 31 of the first lock part 3 until the catch locking element 400 comes into engagement with an allocated catch section 32 on the recess 31 (see the closing state in FIG. 12C). Establishing the closing state is here supported by a magnetic attracting force FM between the magnet 25 on the second lock part 2 and the magnet 35 on the first lock part 3 in fastening direction E. The second lock part 2 is pulled into the recess 31 by the magnetic attracting force FM, wherein the second lock part 2 takes the actuating element 4 with it until said actuating element 4, with the catch locking element 400, comes into positive-locking engagement with the catch section 32 on the first lock part 3.

FIG. 12C shows the lock device 1 in the closing state in the unloaded state and FIG. 12D in the loaded state. In the loaded state tensile forces FB act on the second lock part 2 and have the effect that the blocking section 22 comes into rear-side contact on the catch locking elements 400 and consequently prevents that the catch locking element 400 can move radially inwards. In the unloaded state, however, the blocking section 22 does not engage with the catch locking element 400, so that by applying a tensile force FA onto the actuating element 4 the actuating element 4 can be removed from the recess 31 of the first lock part 3 together with the second lock part 2, wherein for this purpose the magnetic force FM between the magnets 25, 35 is to be overcome.

A further embodiment of a lock device 1 is illustrated in FIGS. 14A to 14D, in which on the first lock part 3 in a recess 31 multiple catch sections 32, axially offset relative to each other, are provided which each extend circumferentially around the recess 31 in the form of ring-shaped indentations.

Figure 14C:
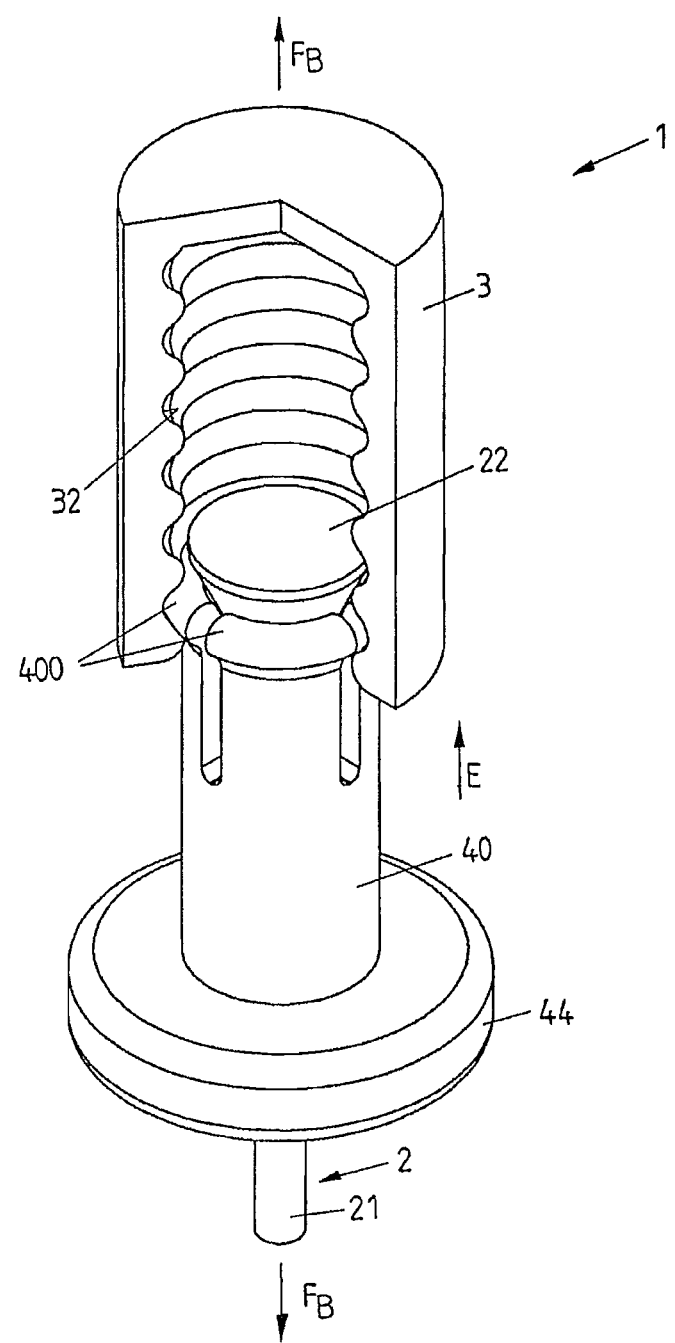
Figure 14D:
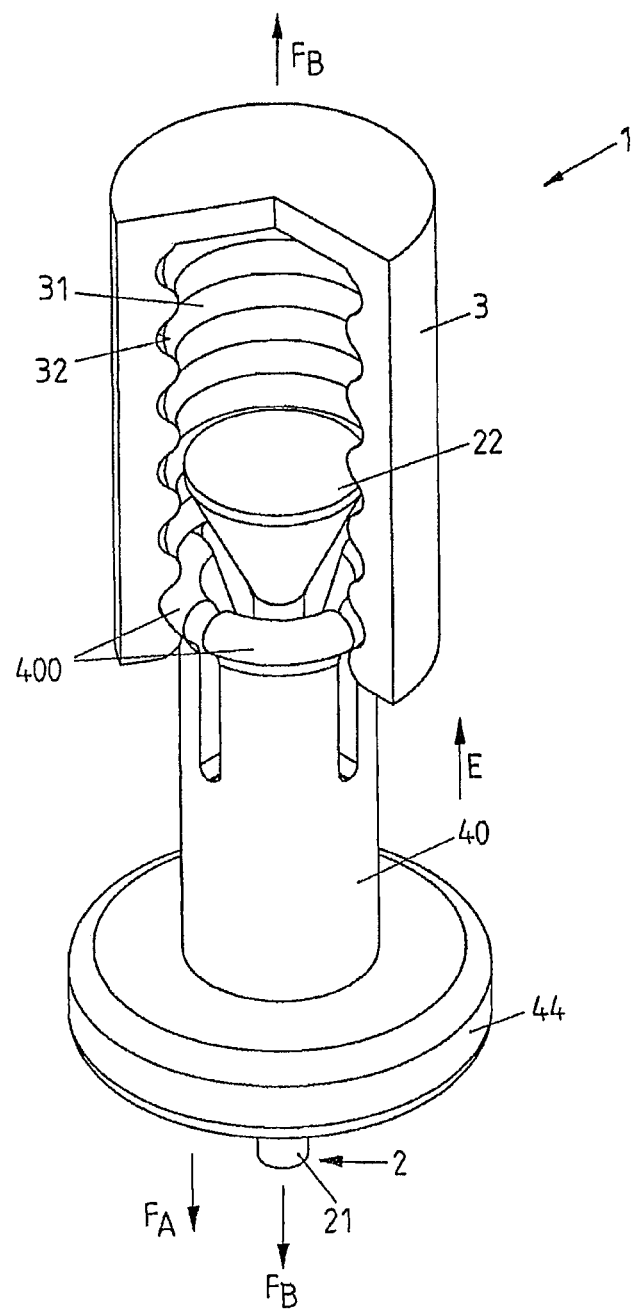

FIG. 14A shows the lock device 1 in an exploded view, FIG. 14B in a first closing state in the loaded state, FIG. 14C in a second closing state in the loaded state and FIG. 14D in the second closing state, however, in the unloaded state.

As multiple catch sections 32, axially offset relative to each other, are provided in the recess 31, the lock device 1 can assume multiple closing states according to FIGS. 14A to 14D. Herein, the closing states differ by the axial position of the actuating element 4 in the recess 31, wherein in each closing state the catch locking elements 400 on the actuating element 4 are catch-lockingly engaged with a catch section 32 on the recess 31 of the first lock part 3.

Yet again, the lock device 1 is blocked when loaded, in that the blocking section 32, which is formed conical in this embodiment, runs up onto the catch locking elements 400 on the rear side counter to the fastening direction E and blocks these in the respective closing state on the first lock part 3 in such a way that they cannot be pushed radially inwards and, consequently, cannot come out of engagement with the respective catch section 32.

When the lock device 1 is unloaded, the blocking section 22 can assume an unblocked position, as illustrated in FIG. 14D. In this position of the blocking section 22 the catch locking elements 400 can be bent radially inwards, so that by applying a tensile force FA onto the actuating element 4 counter to the fastening direction E the actuating element 4 can be pulled out of the recess 31. In the unloaded state the catch locking elements 400 are not held positive-locking on the first lock part 3 due to the rounded design of the catch sections 32 and the catch locking elements 400.

The embodiment according to FIGS. 14A to 14D is particularly suited for lock devices in which, at the same time, a setting of the length is to be carried out also in order to, for example, adjust the longitudinal position of two straps relative to each other.

In modification of the embodiment according to FIGS. 14A to 14D also a mere length setting device can be designed in the specified manner, in which the axial position of two parts 2,3 can be adjusted relative to each other by shifting the actuating element 4 within the first lock part 3. Under load this length setting device is then blocked, whereas in the unloaded state it can be set in the longitudinal position.

For example, a device of this kind can be employed to set the length of a ski stick. One half of the ski stick is then connected to the first lock part 3 and a second half to the second lock part 2, wherein in the unloaded state the length of the ski stick can be set by shifting the actuating element 4 in the recess 31 of the first lock part 3. In the loaded state, however, the length setting device is blocked by contact of the blocking section 22 on the catch locking elements 400.

In this embodiment, advantageously the blocking section 22 is pre-loaded into the blocked state, so that after an adjustment the length setting device blocks automatically and the ski stick cannot adjust by itself.

In the previously specified embodiments a blocking can also be attained when the lock device 1 is under tension or compression by using a double cone and corresponding run-up slopes on the rear side of the catch locking elements 400 on both sides, wherein under tensile load one of the cone halves runs up onto an allocated run-up slope on the rear side of the catch locking elements 400 counter to the fastening direction and under compressive load the other cone half runs up onto another run-up slope on the rear side of the catch locking elements 400 in the fastening direction E and consequently blocks the catch locking elements 400.

When a lock device is designed to absorb compressive forces in the fastening direction E the alignment of the cone and the allocated run-up slopes in the preceding embodiments can simply be reversed.

In all the illustrated embodiments the individual parts of the lock device 1 are advantageously made out of plastic, for example as injection-moulded plastic parts.

The idea underlying the invention is not restricted to the previously described exemplary embodiments, but instead can basically be realized also in embodiments of an entirely different kind. In particular, individual components, e.g. the first lock part, the second lock part and the actuating element, can be formed entirely different and be arranged on each other in another manner.

For example, as the second lock part 2 on the actuating element 4 is moveable, a multitude of further applications beyond the mentioned applications also emerge, e.g. the clamping of a strap in a length adjustment in the blocked, loaded state upon release into the unblocked, unloaded state.

Lock devices of the kind specified here can be employed everywhere, where two parts shall be detachably connected to each other. For example, such a lock device is suitable as a lock for a bag or another container, as holding device or as connecting device to connect two elements under tension, for example two hauling ropes or straps. In concrete application such a lock device can for example be employed to couple a leash with a collar for pets.

Such applications are also conceivable and advantageous, in which the lock device may not open under load, such as e.g. buckles for baby carrier devices, locks for life jackets or the like.

The invention claimed is:

1. A lock device for releasably connecting two elements to each other, comprising:
   a first lock part connectable to a first element,
   a second lock part connectable to a second element, wherein the second lock part can be arranged on the first lock part in a fastening direction and is connected to the first lock part in a closing state of the lock device, and wherein, in a loaded state of the lock device, a force is acting on the second lock part relative to the first lock part along the fastening direction, and
   an actuating element, on which the second lock part is movably arranged,
   wherein in the closing state the second lock part is held on the first lock part via the actuating element and the second lock part acts together with the actuating element in such a way that in the loaded state, the actuating element is fixedly connected to the first lock part and holds the second lock part on the first lock part, whereas in an unloaded state the second lock part can be detached from the first lock part by actuation of the actuating element, and
   wherein in the closing state the actuating element is held by friction or catch locking on the first lock part via a section provided between the first lock part and the second lock part, which is elastic at least in sections.

2. The lock device according to claim 1, wherein the friction-locking or catch-locking connection between the actuating element and the first lock part is blocked in the loaded state of the second lock part, whereas in the unloaded state of the second lock part it can be released.

3. The lock device according to claim 1, wherein the actuating element can in the fastening direction be inserted together with the second lock part into a recess of the first lock part to establish the closing state and, to release, can be taken out from the recess counter to the fastening direction.

4. The lock device according to claim 1, wherein the second lock part is arranged shiftably along the fastening direction on the actuating element.

5. The lock device according to claim 4, wherein the second lock part is mounted shiftably on the actuating element via at least one guiding opening.

6. The lock device according to claim 1, wherein in the closing state in the loaded state the actuating element is held friction-locking by static friction on the first lock part.

7. The lock device according to claim 6, wherein the second lock part has a blocking section with at least one run-up slope, which, when a force is acting on the second lock part relative to the first lock part along the fastening direction, runs up onto a run-up slope on a section of the actuating element, so that the blocking section connects the section of the actuating element to the first lock part by friction.

8. The lock device according to claim 7, wherein the second lock part has a blocking section, which connects the second lock part and the actuating element to each other in such a way that, when a force is acting on the second lock part, the blocking section acts onto a section of the actuating element, so that the blocking section connects the section of the actuating element to the first lock part by friction.

9. The lock device according to claim 6, wherein in the unloaded state the actuating element is held on the first lock part by static friction.

10. The lock device according to claim 1, wherein the actuating element has at least one catch locking element, which in the closing state engages positive-locking with a catch section of the first lock part.

11. The lock device according to claim 10, wherein the second lock part has a blocking section, which in the loaded state, when a force is acting on the second lock part, acts together with the at least one catch locking element of the actuating element to block the catch-locking connection of the actuating element to the first lock part.

12. The lock device according to claim 11, wherein the blocking section has at least one run-up slope, which, when a force is acting on the second lock part, runs up onto a run-up slope of the at least one catch locking element in such a way that the at least one catch locking element cannot be detached from the catch section.

13. The lock device according to claim 11, wherein the blocking section, when a force is acting on the second lock part, comes into engagement with a housing section of the at least one catch locking element in such a way that the at least one catch locking element cannot be detached from the catch section.

14. The lock device according to claim 11, wherein the blocking section connects the second lock part and the actuating element to each other in such a way that when a force is acting on the second lock part the blocking section acts onto a section of the actuating element in such a way that the at least one catch locking element cannot be detached from the catch section.

15. The lock device according to claim 10, wherein in the unloaded state the positive-locking connection between the at least one catch locking element of the actuating element and the catch section of the first lock part can be released by applying a compressive force onto the at least one catch locking element and removing the at least one catch locking element from the catch section.

16. The lock device according to claim 10, wherein in the unloaded state the positive-locking connection between the at least one catch locking element of the actuating element and the catch section of the first lock part can be released by applying a tensile force onto the actuating element relative to the first lock part.

17. The lock device according to claim 16, wherein the at least one catch locking element has a slope, which is designed in such a way that when a tensile force is acting onto the actuating element counter to the fastening direction, the slope runs up onto the catch section and thereby the positive-locking connection of catch locking element and catch section is released.

18. The lock device according to claim 10, wherein in the unloaded state the positive-locking connection between the at least one catch locking element of the actuating element and the catch section of the first lock part can be released by turning the actuating element around the fastening direction or by shifting the actuating element relative to the first lock part transverse to the fastening direction.

19. The lock device according to claim 1, further comprising restoring means to transfer the second lock part either into an unblocked position relative to the actuating element in the unloaded state or into a blocked position relative to the actuating element.

20. The lock device according to claim 19, wherein the restoring means are formed mechanically by a spring or magnetically.

\* \* \* \* \*